United States Patent
Adachi et al.

(10) Patent No.: US 11,902,484 B2
(45) Date of Patent: Feb. 13, 2024

(54) IMAGE PROCESSING SYSTEM AND IMAGE PROCESSING APPARATUS UTILIZING TRIAL MODE

(71) Applicant: Brother Kogyo Kabushiki Kaisha, Nagoya (JP)

(72) Inventors: Toyoshi Adachi, Kakamigahara (JP); Ken Saito, Tokoname (JP); Yoshi Hirasawa, Anjo (JP); Satoshi Tanimoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/400,212

(22) Filed: Aug. 12, 2021

(65) Prior Publication Data
US 2022/0060597 A1 Feb. 24, 2022

(30) Foreign Application Priority Data

Aug. 21, 2020 (JP) .................................. 2020-139861
Jan. 29, 2021 (JP) .................................. 2021-012772

(51) Int. Cl.
*H04N 1/00* (2006.01)
*H04N 1/21* (2006.01)

(52) U.S. Cl.
CPC ....... *H04N 1/00938* (2013.01); *H04N 1/0097* (2013.01); *H04N 1/00244* (2013.01);
(Continued)

(58) Field of Classification Search
CPC .......... H04N 1/00938; H04N 1/00244; H04N 1/00413; H04N 1/00925; H04N 1/0097; H04N 1/2104; H04N 2201/0094
See application file for complete search history.

(56) References Cited

U.S. PATENT DOCUMENTS

2005/0007620 A1* 1/2005 Kouno ................. H04N 1/4433
358/1.14
2007/0011289 A1* 1/2007 Goto .................. H04N 1/00344
709/223

(Continued)

FOREIGN PATENT DOCUMENTS

JP 2018-151700 A 9/2018

*Primary Examiner* — Nicholas Pachol
(74) *Attorney, Agent, or Firm* — BURR PATENT LAW, PLLC

(57) ABSTRACT

According to aspects of the present disclosure, in a memory of an MFP, information indicating that an additional function, which is inactivated when shipped from a factory, is activated or inactivated is stored. The MFP starts a trial mode in which trial of the additional function is activated, then the additional function becomes activated within an effective period of the trial mode. The MFP is configured to receive an input of setting information used for the additional function, store the input setting information in the memory and execute a process of the additional function in accordance with the setting information. Further, when the trial mode is terminated, the MFP initializes the setting information in a case where the stored information indicates that the additional function is inactivated, but does not initialize the setting information in a case where the stored information indicates that the additional function is activated.

20 Claims, 12 Drawing Sheets

(52) U.S. Cl.
CPC ..... *H04N 1/00413* (2013.01); *H04N 1/00925* (2013.01); *H04N 1/2104* (2013.01); *H04N 2201/0094* (2013.01)

(56) References Cited

U.S. PATENT DOCUMENTS

| | | | |
|---|---|---|---|
| 2009/0122356 A1* | 5/2009 | Mihira | H04N 1/00127 358/402 |
| 2016/0381243 A1* | 12/2016 | Manabe | H04N 1/00962 358/1.15 |
| 2017/0255763 A1* | 9/2017 | Han | G06F 21/121 |
| 2018/0262477 A1 | 9/2018 | Saito | |
| 2018/0359390 A1* | 12/2018 | Kawabata | G06F 8/61 |
| 2020/0036857 A1* | 1/2020 | Kato | H04N 1/00204 |

\* cited by examiner

| TRIAL NUMBER | DEVICE ID | MODEL NAME | TRIAL START DATE | TRIAL END DATE |
|---|---|---|---|---|
| 1 | 12345 | MODEL P1 | DATE S1 | DATE E1 |
| 2 | 67890 | MODEL P2 | DATE S2 | DATE E2 |

| FUNCTION | | EXECUTION CONDITION | ACCUMULATE PLACE |
|---|---|---|---|
| FIRST SP FUNCTION | BASIC FUNCTION | PIN INPUT | MEMORY OF MFP |
| SECOND SP FUNCTION | ADDITIONAL FUNCTION | LOGIN AUTHENTICATION | MEMORY OF MFP |
| THIRD SP FUNCTION | ADDITIONAL FUNCTION | LOGIN AUTHENTICATION | SHARED SERVER |

| ADDITIONAL FUNCTION | | INFORMATION TO BE INITIALIZED OR DELETED |
| --- | --- | --- |
| SECOND SP FUNCTION | THIRD SP FUNCTION | |
| INACTIVATE | INACTIVATE | ACCESS INFORMATION OF SHARED SERVER, PRINT JOB OF SECOND SP FUNCTION |
| ACTIVATE | INACTIVATE | ACCESS INFORMATION OF SHARED SERVER, PRINT JOB OF FIRST SP FUNCTION |
| INACTIVATE | ACTIVATE | STORING DESTINATION OF MFP, PRINT JOBS OF FIRST AND SECOND SP FUNCTIONS |

FIG. 15

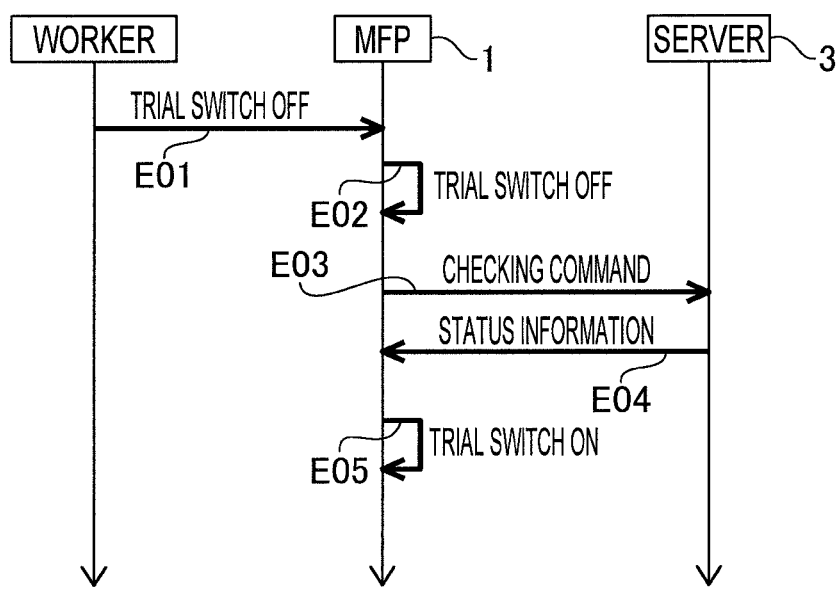

FIG. 16

IMAGE PROCESSING SYSTEM AND IMAGE PROCESSING APPARATUS UTILIZING TRIAL MODE

CROSS-REFERENCE TO RELATED APPLICATIONS

This application claims priority under 35 U.S.C. § 119 from Japanese Patent Applications No. 2020-139861 filed on Aug. 21, 2020 and No. 2021-012772 filed on Jan. 29, 2021. The entire subject matters of the applications are incorporated herein by reference.

BACKGROUND

Technical Field

The technical fields disclosed herein relate to image processing systems and image processing apparatuses. More particularly, the present disclosures relate to activating or inactivating special functions in an image processing apparatus.

There are image processing apparatuses which are equipped with special functions (solutions) of which settings can be changed between an activated state and an inactivated state. The special function is typically inactivated when the image processing apparatus is shipped from the factory. Thereafter, for example, when a user who purchased the image processing apparatus makes a contract to use the special function with a seller of and a particular command is input into the image processing apparatus to activate the special function, the image processing apparatus is activated to perform the special function.

SUMMARY

Some users may wish to try the special function before entering into the contract. In such a case, for example, the seller of the image processing apparatus may activate the special function temporarily, and after the user finishes trying the function, the seller of the image processing apparatus may activate the special function. However, to perform such operations is time-consuming. Further, during an effective period if a trial mode in which the special function is temporarily activated, handling of data entered to use the special function becomes a problem.

According to aspects of the present disclosures, there is provided an image processing system comprising an image processing apparatus and a server. The image processing apparatus has a memory, wherein the server is configured to receive a start request of a trial mode, the trial mode being a mode in which all of the plurality of the special function are activated to be tried, the start request including identification information of the image processing apparatus, the special function being a function of the image processing apparatus, the special function being not activated when the image processing apparatus is shipped from a factory, in response to receipt of the start request, set an effective period of the trial mode, store period information indicating the effective period of the trial mode in association with the identification information of the image processing apparatus, and output a start command indicating start of the trial mode. The image processing apparatus is configured to start the trial mode in response to receipt of the start command, the special function is activated during the trial mode, and transmit a checking command to the server at a first timing after receipt of the start command, the checking command including the identification information. The server is configured to, in response to receipt of the checking command from the image processing apparatus, determine whether a current time is within the effective period of the trial mode based on the period information associated with the identification information of the image processing apparatus, and respond to the image processing apparatus by transmitting a status information indicating a determination result of determining whether the current time is within the effective period of the trial mode. The image processing apparatus terminates the trial mode in response to receipt of the status information indicating a first status from the server, a timing of terminating the trial mode being a second timing after receiving the status information, the first status being a status where the current time is not within the effective period.

According to aspects of the present disclosures, there is provided an image processing apparatus comprising an image processor, a user interface configured to display a home screen, an image process being selectable from a plurality of image processes on the home screen, each of the plurality of image processes being a process using an image processor, a memory, and a computer. The image processing apparatus has a special function, the memory storing setting indicating that the special function is to be activated or inactivated, the special function being inactivated when the image processing apparatus is shipped from a factory. The computer is configured to, when receiving an input of a start command indicating start of a trial mode, execute a start process of starting the trial mode, the trial mode being a mode in which the special function is activated to be tried an effective period being set to the trial mode, the special function becoming activated during the effective period of the trial mode. The computer is configured to perform a determining process of determining, at a first timing after receipt of the start command, whether a current time is within the effective period of the trial mode, a termination process of terminating the trial mode at a second timing after determining that the current time is not within the effective period of the trial mode, and a first notification process of executing first notification to notify termination of the trial mode when displaying the home screen on the user interface after determining that the current time is not within the effective period of the trial mode and before the second timing.

According to aspects of the present disclosures, there is provided an image processing apparatus comprising an image processor, a user interface, a memory, and a computer. The image processing apparatus has a special function. The computer is configured to perform, when receiving to activate the special function, a changing process of activating the special function by updating function information of the special function stored in the memory such that the function information indicates that the special function is to be activated, the function information of the special function indicating that the special function is not activated when the image processing apparatus is shipped from a factory, and, when receiving a start command indicating start of a trial mode, a starting process of starting the trial mode, the trial mode being a mode in which the special function is activated to be tried, an effective period being set to the trial mode, the special function becoming activated during the effective period of the trial mode. The computer is configured to perform an inputting process of inputting setting information used by the special function through an operation on the user interface during the effective period of the special function, storing the setting information input in the inputting process in the memory, and a process of the special function in accordance with the setting information stored in the memory. The computer is further configured to perform a determining process of determining whether a current time is within the effective period of the trial mode at a first timing within a period of the trial mode, and a termination process of terminating the trial mode at a second timing after determining that the current time is not within the effective period in the determining process. After termination of the trial mode in the termination process, the computer is configured to perform an initialization process of initializing the setting information stored in the memory in a case where the function information indicating that the special function is to be inactivated is stored in the memory, and not perform the initialization process in a case where the function information indicating that the special function is to be activated is stored in the memory, the special function being continued to be activated after termination of the trial mode in a case where the function information indicates that the special function is to be activated.

According to aspects of the present disclosures, there is provided an image processing apparatus comprising an image processor, a memory, and a computer. The image processing apparatus has a plurality of special functions. The computer is configured to, when receiving a start request of a trial mode, execute a start process of starting the trial mode, the trial mode being a mode in which the special function is activated to be tried, an effective period being set to the trial mode, all of the plurality of special functions becoming activated during the effective period, all of the plurality of special functions being inactivated when the image processing apparatus is shipped from a factory. The computer is configured to perform a determining process of determining, at a first timing, after receipt of the start request, whether a current time is within the effective period of the trial mode, and a termination process of terminating the trial mode at a second timing after determining that the current time is not within the effective period of the trial mode.

BRIEF DESCRIPTION OF THE DRAWINGS

FIG. 15 shows a relationship between activated function and information to be initialized or deleted.

FIG. 16 is a sequence diagram illustrating example of a procedure during a maintenance work in the effective period of a trial mode.

DETAILED DESCRIPTION OF THE EMBODIMENT

Hereinafter, an image processing system according to the present embodiment will be described with reference to the accompanying drawings. The image processing system includes a multifunctional peripheral (hereinafter, referred to as and "MFP") and a server.

Figure 1:
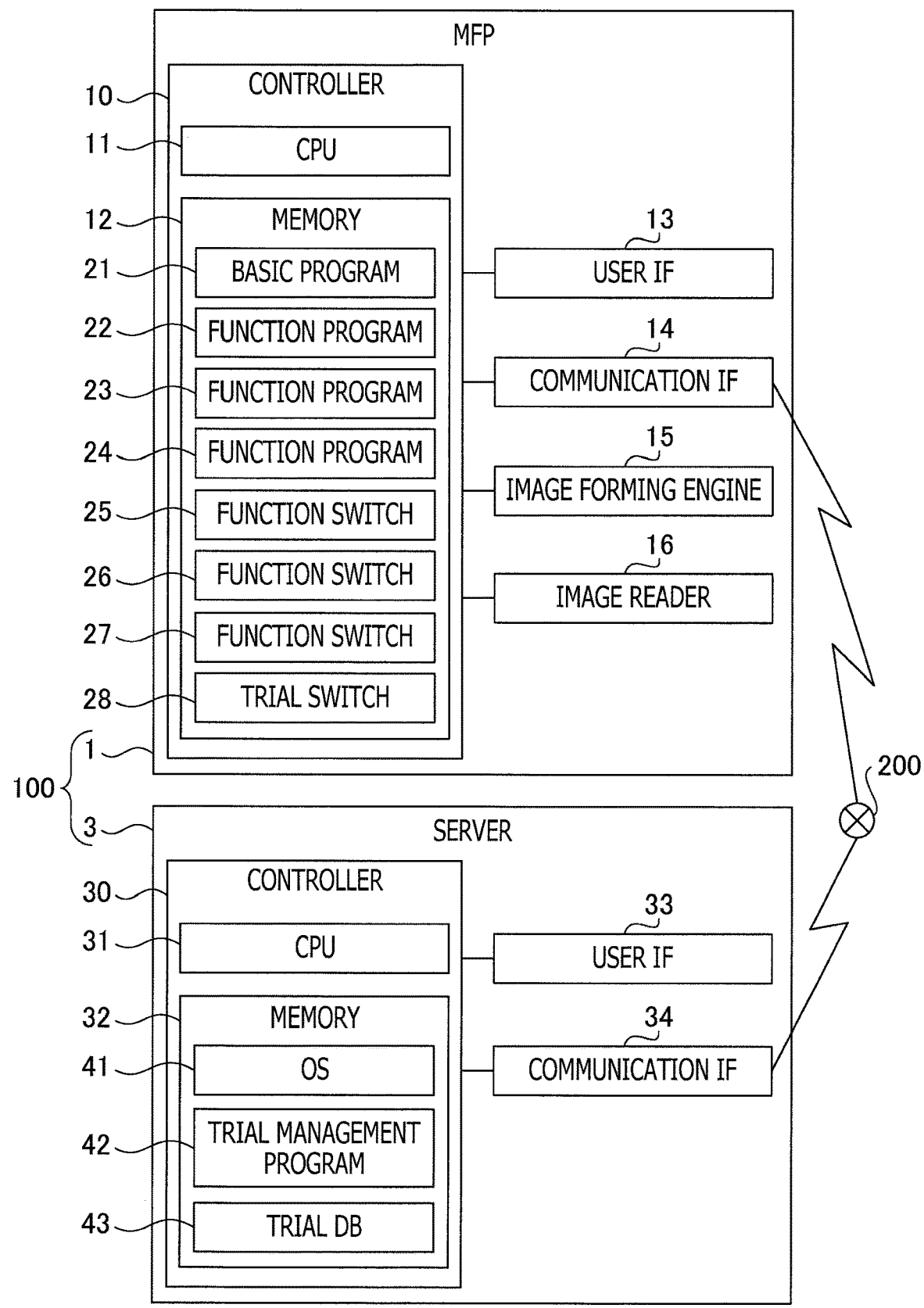
FIG. 1 is a block diagram of an electrical configuration of an image processing system according to an embodiment of the present disclosures.

As shown in FIG. 1, an image processing system 100 includes an MFP 1 and a server 3, each of which is configured to be connected to the Internet 200. The system 100 is an example of an image processing system. The MFP 1 is a device located at and operable by a user, and is configured to perform various image processing functions such as printing and scanning. The MFP 1 is an example of an image processing apparatus. The server 3 is managed, for example, by a vendor of the MFP 1 and is configured to be accessed from each device such as the MFP 1 via the Internet 200.

The MFP 1 according to the present embodiment has a controller 10 including a CPU 11 and a memory 12, as shown in FIG. 1. The CPU 11 is an example of a computer. The MFP 1 is also provided with a user interface (hereinafter, referred to as a "user IF") 13, a communication interface (hereinafter, referred to as a "communication IF") 14, an image forming engine 15, and an image reader 16, which are electrically connected to the controller 10. The image forming engine 15 and the image reader 16 are both examples of an image processor.

The CPU 11 is configured to perform various processes according to programs read from the memory 12 and based on user's operations. As shown in FIG. 1, the memory 12 is configured to store the various programs and the various types of information including a basic program 21, a plurality of function programs 22 to 24, a plurality of function switches 25 to 27, and a trial switch 28. The memory 12 is also used as a work area when various processes are performed. It is noted that a buffer provided to the CPU 11 is also an example of memory.

The user IF 13 includes hardware for displaying a screen for informing the user of information, and hardware for receiving operations by the user. An example of the user IF 13 is a touch panel. The user IF 13 may be a combination of a display and operational members such as buttons.

The communication IF 14 includes at least a configuration capable of connecting to the Internet 200, and includes hardware for communicating with external devices such as a server 3. The communication standard of the communication IF 14 is Ethernet (registered trademark), Wi-Fi (registered trademark), USB or the like. The MFP 1 may be equipped with a plurality of communication IFs 14 respectively corresponding to a plurality of communication standards.

The image forming engine 15 includes a structure configured to print an image based on image data on a printing medium such as a sheet. The image forming method employed by the image forming engine 15 is, for example, an electrophotographic imaging method or an inkjet method, and may be a configuration capable of performing color printing or only monochrome printing. The image reader 16 includes a structure configured to read an image of a document and obtain image data.

The MFP 1 according to the present embodiment is capable of executing various functions using the image forming engine 15 and the image reader 16 by executing the basic program 21 or the function programs 22 to 24. The basic program 21 is a program that is set to be executable at the time of shipping from the factory of the MFP 1, and is a program to allow the MFP 1 to execute basic functions. The basic functions include color copying, monochrome copying, and N-in-1 copying in copy processing, and color scanning, monochrome scanning, and the like in scan processing.

On the other hand, the function programs 22 to 24 are programs for adding special functions to the MFP 1. The MFP 1 according to the present embodiment has a plurality of special functions that can be added, and different additional functions are added by the function programs 22 to 24, respectively. Function switch 25 to 27 respectively corresponding to the function programs 22 to 24 are provided to the MFP 1, and a setting indicating whether the additional function by each of the function programs 22 to 24 is activated or activated is stored depending on the state of the function switch 25 to 27. For example, when a state of the function switch 25 is on, the MFP 1 is configured to accept an instruction to execute a function realized by the function program 22 and can execute the function, while when the state of the function switch 25 is off, the MFP 1 does not accept the instruction to execute the function realized by the function program 22.

When the MFP 1 is shipped from the factory, the function switches 25 to 27 are all turned off, and all the additional functions are set to be inactivated. Then, when the instructions to activate the functions of the function programs 22 to 24 are received after shipment from the factory, the MFP 1 can execute the additional functions by switching the function switches 25 to 27 to ON. By installing the programs of the additional functions into the MFP 1 in advance and activating the MFP 1 to receive instructions to activating the same, an additional value can be added to the MFP 1, and a procedure for adding the additional functions can be simplified. In addition, by activating only the functions that are necessary for the user of the MFP 1, the complexity of the functions can be prevented.

In order to use the functions implemented by the function programs 22-24, the user of MFP 1 needs to make a contract with a vendor or other party for each function to be used. For example, when the user enters into a contract with the vendor to use an additional function, the vendor provides an activating command to activate the function. When the provided activation command is input to the MFP 1, the MFP 1 turns on the corresponding switch and is ready to accept instructions to execute the function.

Additional functions that become executable by the function programs 22-24 include, for example, a secure print function, a custom UI function, a barcode printing function, and a cloud storage function. The secure print function is a function that does not immediately start printing when image data is received, but once stores the image data in memory 12 and starts printing after successful authentication is made by user operation of the user IF 13. The custom UI function is a function to change the arrangement and display form of the soft keys and the like displayed on the user IF 13 according to the user's preference. The barcode printing function is a function that creates barcodes based on designated data and prints the created barcodes. The cloud storage function is a function that transmits image data obtained by reading the image of a document via the communication IF 14 and stores the same in the storage area on a cloud. The types of the function programs to be installed in the MFP 1 at the time of shipment from the factory are predetermined for each model of the MFP 1, but additional installable functions may be provided after shipment from the factory. It is noted that the secure print function is an example of accumulated job function, and a print job of the secure print function is an example of an accumulated job.

The trial switch 28 is a switch to activate all the function programs 22 to 24 stored in the memory 12, even for the functions for which the function switches 25 to 27 are turned off, within an effective period of a trial mode. Within the period when the trial switch 28 is on, the MFP 1 is in the trial mode, and additional functions realized by the function programs 22 to 24 can be executed. Only within the period of the trial mode, the user can try each of the additional functions without contracting the activating of the function programs 22 to 24.

The trial switch 28 has three states which are the on state, an unexecuted state and an executed state. At a time when the MFP 1 is shipped from the factory, the trial switch 28 is set to the unexecuted state. The trial mode is a mode that can be performed only once in each device, and after the trial mode is completed, the trial switch 28 is set to the executed state. The details of the trial switch 28 will be described later.

As shown in FIG. 1, the server 3 according to the present embodiment has a controller 30 that includes a CPU 31, a memory 32, a user IF 33 and a communication IF 34, which are electrically connected to the controller 30. It is noted that the "controllers" 10 and 30 in FIG. 1 are used as generic terms for the hardware and software used to control MFP 1 and server 3, and do not necessarily represent a single piece of hardware that actually exists in the MFP 1 or the server 3.

The CPU 31 executes various processes in accordance with the program read from the memory 32 and based on the operation of the operator. The memory 32 stores various programs and various data including an OS 41, a trial management program 42, and a trial database (hereinafter referred to as a "trial DB") 43, as shown in FIG. 1. The OS 41 is, for example, Windows (registered trademark), macOS (registered trademark), or Linux (registered trademark). The buffer provided to the CPU 31 is also an example of memory.

An example of memory 12 and 32 is not necessarily limited to a ROM, a RAM, an HDD or the like built in the MFP 1 or the server 3, but can also be a storage medium that is readable and writable by the CPU 11 and the CPU 31. The computer-readable storage medium is a non-transitory medium. The non-transitory medium includes recording media such as a CD-ROM, a DVD-ROM or the like, in addition to the above examples. The non-transitory medium is also a tangible medium. On the other hand, an electrical signal carrying a program that is downloaded from a server or the like on the Internet is a computer readable signal medium, which is a kind of computer-readable medium, but is not included in the non-transitory computer-readable storage media.

The user IF 33 includes hardware for displaying a screen for notifying information and hardware for receiving the user operations. The user IF 33 may be a combination of a display and operation members such as a keyboard, a mouse, a trackball and the like. Alternatively, the user IF 33 may be a touch panel that has both displaying and operation receiving functions.

The communication IF 34 includes hardware for communicating with external devices such as the MFP 1 via the Internet 200. The communication standard employed by the communication IF 34 is Ethernet (registered trademark), Wi-Fi (registered trademark) or the like. The server 3 may have multiple communication IFs 14 respectively corresponding to multiple communication standards.

The server 3 according to the present embodiment manages the trial of the additional functions in each device such as the MFP 1 by executing the trial management program 42. Concretely, the server 3 receives a request from the MFP 1 or the like to start the trial, transmits a command to turn on the trial switch 28 and the like, and further manages the effective period of the trial mode.

Next, a procedure to perform the trial of additional functions will be described with reference to a sequence diagram. It is noted that the processes described below basically show the processing of the CPUs 11 and 31 according to the instructions described in the program. It is noted that the processes of "determining," "extracting," "selecting," "calculating," "deciding," "identifying," "obtaining," "receiving," "controlling," and the like in the following description represent processes of the CPUs 11 and 31. The processing by each of the CPUs 11 and 31 includes hardware control using the API of the OS. In this specification, the operation of each program is explained with the description of the OS itself is omitted. That is, in the following description, a statement that "a program B controls hardware C" is intended to mean that "a program B uses the API of the OS to control hardware C." In addition, the processing of the CPU 11 or 31 according to the instructions described in a program may be expressed in an omitted or simplified manner such as "the CPU 11 performs." In addition, the processing of the CPU 11 or 31 according to the instructions described in the program may be expressed, with a recitation of the CPU 11 or 31 being omitted, as "the program A performs."

It is noted that a term "acquisition" or "obtaining" is used in a concept that does not require a request. In other words, the process of the CPU 11 or 31 receiving data without requesting is also included in the concept of "the CPU acquire data." Further, "data" in this specification is represented by a computer-readable bit string. Further, two pieces of data having the same substantive meaning and content but different formats will be treated as the same data. The same applies to "information" in this specification. Further, "requesting" and "designating" are concepts of outputting information indicating what is being requested or designated to a destination device or the like. It is further noted that the information indicating that something is being requested or designated may be described simply as the "request" or "designation."

A process in which the CPU 11 or 31 determines whether information A indicates a matter B or not may be described conceptually as "determining whether there is a matter B or not based on information A." Further, a process in which the CPU 11 or 31 determines whether information A indicates a matter B or a matter C may be conceptually described as "determining whether it is matter B or matter C based on information A."

A start procedure to start the trial of the additional functions in the MFP 1 is described with reference to a sequence diagram shown in FIG. 2. Initially, the user inputs a start instruction, which is an instruction to start the trial mode, through the user IF 13 of the MFP 1 (A01). It is noted that a person who inputs the start instruction of the trial mode in A01 of FIG. 2 or in FIG. 5 (described later) is not necessarily limited to the user who uses the MFP 1, but may be, for example, a serviceperson or a salesperson.

In response to receipt of the start instruction, the MFP 1 accesses the server 3 and transmits a request to start the trial mode (A02). In A02, the MFP 1 also transmits identification information and model information of the MFP 1 itself together with the start request.

Upon receiving the request to start the trial mode, the server 3 sets the effective period of the trial mode in the MFP 1 based on the time at which the server 3 has received the request (A03). A length of the effective period may be uniform for all the devices, or may be different according to the model information, or according to the user of the device, the installation area, or the like. When the length of the effective period is determined according to the user of the device, the installation area, or the like, the MFP 1 adds the information necessary for determining the effective period to the start request and transmits the same. The server 3 may be configured to receive a designation of the start date of the trial mode as the start request of the trial mode. In such a case, the server 3 may set the effective period based on the designated start date.

Figures 3, 4:
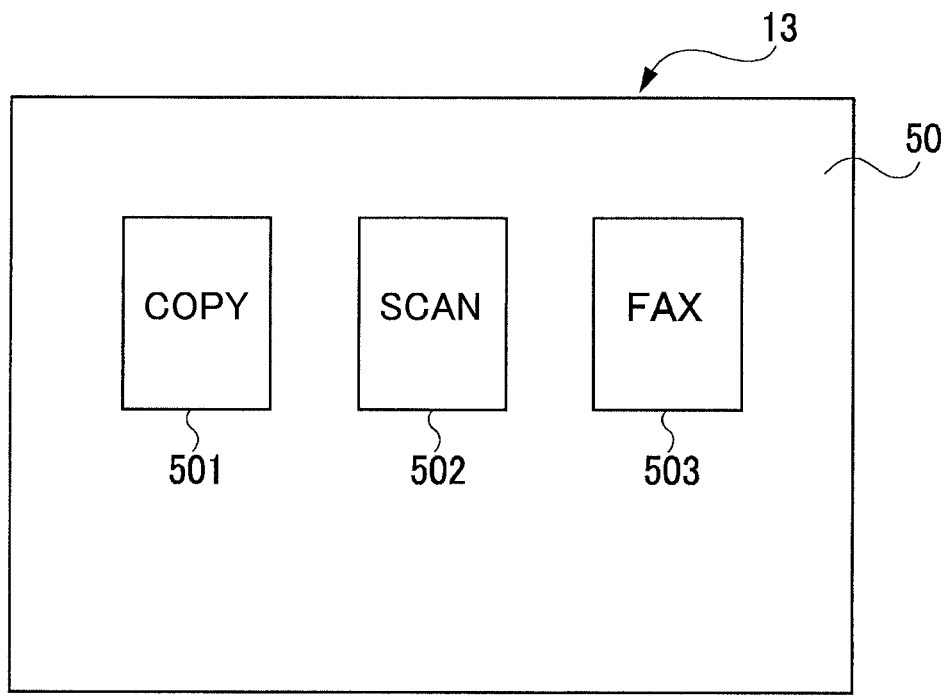
FIG. 3 shows an example of a home screen.
FIG. 4 shows an example of information stored in a trial DB.

The server 3 associates the set effective period of the trial mode with the identification information of the device that is the target of the trial mode and stores the same in the trial DB 43 of the memory 32 (A04). An example of the information stored in the trial DB 43 is shown in FIG. 4. In the trial DB 43, for example, for each sequentially numbered trial number, a device ID, a model name, a trial start date, and a trial end date are associated. The device ID is identification information that distinguishes each device that is the target of the trial mode, and is, for example, a MAC address, a serial number or the like. The model name is information that indicates the model of the device that is the target of the trial mode. The trial start date is the date when the trial mode starts, and the trial end date is the date after a predetermined effective period from the trial start date. The device is in the trial mode on the trial end date. In other words, the period during which the device is in the trial mode (i.e., the effective period) is the period from the trial start date to the trial end date. The information of the trial start date and the trial end date is an example of the period information.

In A04, the server 3 adds a new record to the trial DB 43 and stores the information of the MFP 1. Further, the server 3 transmits a start command, which is a command to start the trial mode, to the MFP 1, which is a sender of the start request (A05). The start command is includes an instruction to make the MFP 1 turn on the trial switch 28. The start command may further include the identification information of the MFP 1, which is the device to execute the trial. The MFP 1 turns on the trial switch 28 (A06) upon receiving the start command, and enters the trial mode. It is noted that a process in A06 is an example of a starting process. As described above, it becomes possible for the user of the MFP 1 to try the additional functions provided by the function programs 22 to 24, respectively.

The MFP 1 executes the process of A06 in a state where the trial switch 28 is not yet in the executed state. If the trial mode has already been executed in the MFP 1, the state of the trial switch 28 has already been in the executed mode, as described below. In such a case, the MFP 1 transmits the information indicating the end of the trial to the server 3 without changing the state of the trial switch 28. The processing at the time of the trial termination in the server 3 will be described later.

The MFP 1 displays a home screen 50, for example, as shown in FIG. 3 on the user IF 13 when the MFP 1 is started, when the MFP 1 returns from a power saving mode, when the MFP 1 has not received any operation by the user for a particular period of time, or after a process by the user operation has been completed. The home screen 50 is a screen that includes buttons 501-503 and the like for receiving a user selection of types of processing such as copying, scanning, facsimile transmission and the like. When the MFP 1 receives a user selection of the type of processing on the home screen 50, the MFP 1 displays on the user IF 13 a setting screen to receive detailed settings according to the selected type of processing.

Prior to displaying the home screen 50, the MFP 1 checks whether the trial switch 28 or any one of the function switches 25 to 27 is turned on (A10). The additional functions added by the trial switch 28 and the function switches 25 to 27 include the functions added to the home screen 50 and made selectable and the functions added to the setting screen and made selectable. The additional functions added to the home screen 50 include, for example, a secure print and a custom UI. The additional functions added to the setting screen include a barcode printing, which becomes selectable on the setting screen of the copy process, and a cloud storage, which becomes selectable on the setting screen of the scan process.

The MFP 1 determines display contents of the home screen 50 based on the status of each switch checked in A10, and displays the determined home screen 50 on the user IF 13 (A11). The MFP 1 receives the user's selection on the displayed home screen 50 via the user IF 13 (A12). The instruction in A12 is given by a user using the MFP 1. Then, based on the status of each switch confirmed in A10, the MFP 1 determines the display contents of the setting screen for the process selected in A12, and displays the determined setting screen on the user IF 13 (A13).

The MFP 1 displays, in a selectable manner, the basic functions and the additional functions that can be received in the home screen 50 or each setting screen (A14). For example, when the trial switch 28 is turned on in A06, the MFP 1 displays all the additional functions (i.e., activated functions) so as to be selectable. Even in a case where the trial switch 28 is off, in a case where at least one of the function switches 25 to 27 is on, the MFP 1 displays the additional functions corresponding to the switch that is on in a selectable manner. The user selects a function to be executed from the displayed functions and inputs an execution instruction to the MFP 1 (A15). The MFP 1 executes the instructed function (A16).

On the other hand, when the trial switch 28 is turned off, the MFP 1 does not display the additional functions for which the corresponding function switches 25 to 27 are turned off (i.e., non-activated functions) on the home screen 50 or the respective setting screens (A17). For example, when the trial switch 28 is off and all the function switches 25 to 27 are off, the MFP 1 displays only the basic functions provided by the basic program 21 in a selectable manner. Since the user cannot select the functions that are not displayed, and the user can use none of the additional functions which are not displayed in the selectable manner. It is noted that the MFP 1 may be configured to display such functions in an unselectable manner instead of not displaying the same.

Next, another example of the procedure for starting the trial will be described. In FIG. 2, an example in which the MFP 1 itself receives the instruction to start the trial, transmits the start request to server 3, and receives the start command from server 3 is described (A01 to A06). Such a procedure can be executed not by the MFP 1 itself, but by another device. In the following, the procedure for starting the trial using a personal computer (hereinafter, referred to as a "PC") will be described with reference to a sequence diagram shown in FIG. 5. The sequence diagram in FIG. 5 shows a procedure to be executed in place of the procedures A01 to A06 in FIG. 2.

Figure 5:
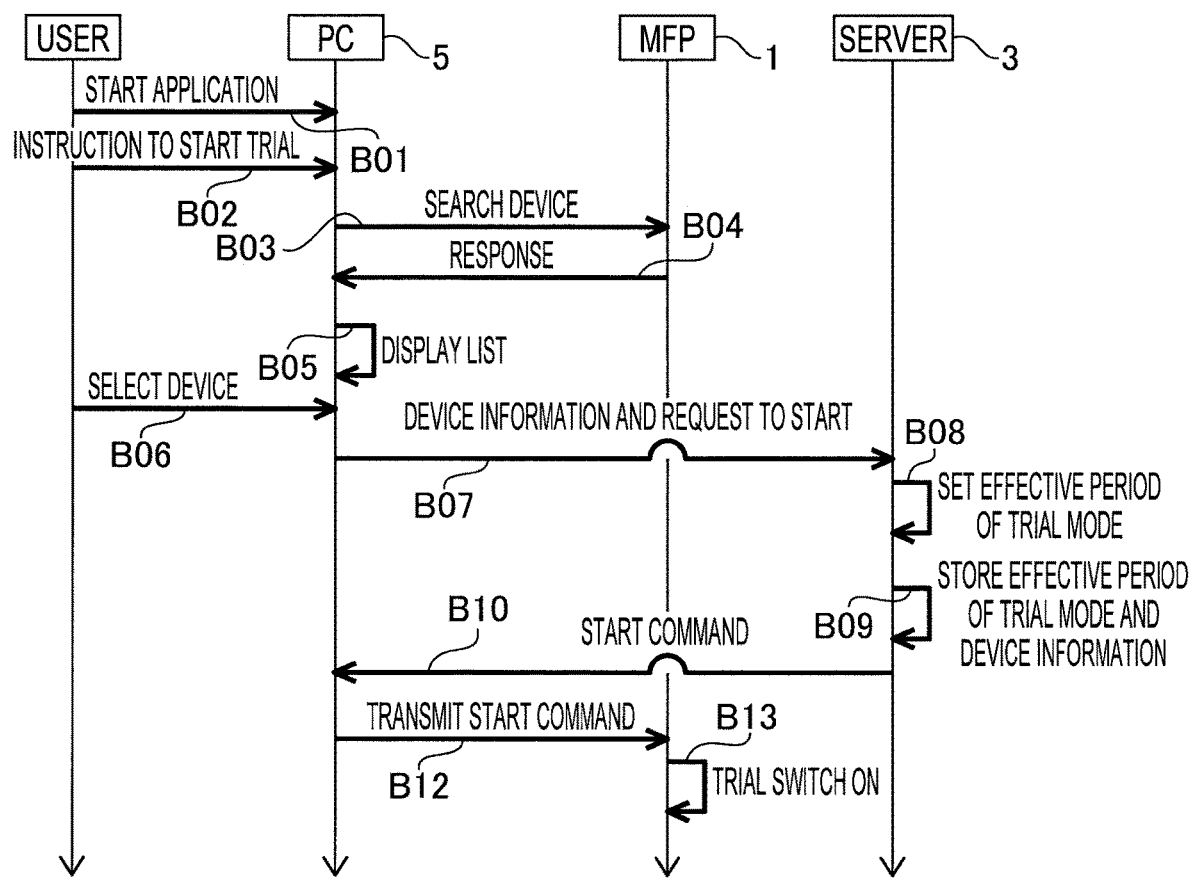
FIG. 5 is a sequence diagram illustrating an example of a procedure of starting the trial mode.

The PC 5 in FIG. 5 is a device in which an application program (hereinafter, referred to simply as an "application") for performing a process of starting the trial is executed. The device is configured to communicate with both the MFP 1 and the server 3. It is noted that the PC 5 is an example of an information processing device. It is noted that a smart phone or a tablet computer may be used instead of the PC 5.

The user of the PC 5 starts an application on the PC 5 (B01) and inputs the start instruction, which is an instruction to execute a process to start the trial mode, in the started application (B02). The PC 5 outputs a search signal used to detect a device that is the target of the trial (B03). The MFP 1 transmits a response signal to the PC 5 (B04) in response to the search signal transmitted by the PC 5. If there is another device other than the MFP 1 that can respond to the search signal transmitted from the PC 5, the device also transmits a response signal to the PC 5. The response signal includes the identification information of the device that responded. The PC 5 receives the response signal from the MFP 1 and other device, and displays (B05) a list of all the devices from which the response signals are received.

The user selects a device which is the target of the trial from among the listed devices (B06). The PC 5 transmits the identification information identifying the selected device and a request to start the trial to server 3 (B07). The information transmitted in B07 is the same as the information transmitted in A02 of FIG. 2. Upon receiving the information transmitted in B07, the server sets the effective period of the trial mode (B08), associates the set effective period of the trial mode with the identification information of the device which is to perform the trial and stores the same in the trial DB 43 of the memory 32 (B09). The processes in B08 and B09 are the same processes as in A03 and A04.

The server 3 transmits information including the start command (B10) to the PC 5 that is the device transmitted the start request. The information transmitted from the server 3 includes the identification information of the device which is transmitted from the PC 5. Based on the information received from the server 3, the PC 5 transmits the start command to the device identified by the identification information (B12). Thus, the start command is input to the MFP 1. As the start command is input, the MFP 1 turns on the trial switch 28 (B13), thereby entering the trial mode. The process in B13 is the same process as in A06 in FIG. 2 and is an example of a start process.

Before transmitting the start command to the MFP 1, the PC 5 may inquire the user whether it is allowed to transmit the start command or not. The PC 5 may be configured to store the received start command in a USB memory or the like, and the MFP 1 may be configured to read the thus stored start command from the USB memory or the like, thereby the start command being input to the MFP 1.

The PC 5 may be configured to display the start command based on the information received from the server 3, and a user such as a serviceperson may input the displayed start command into the MFP 1. For example, the start command may be a text string such as a sequence of numbers, and the user may input the text string into the MFP 1 using the user IF 13 of the MFP 1.

In the present embodiment, the identification information of the device which is to be operated in the trial mode is added to the start command transmitted from the server 3. Such a configuration makes it easy to identify the target device to which the start command is input, for example, even for a user who starts the trial mode in multiple devices. Further, when the identification information of the device is included in the start command, even if the user makes a mistake and inputs a wrong start command (i.e., the start command for another MFP) to the target MFP 1, the MFP 1 can determine whether the input start command is for the MFP 1 itself or not. According to such a configuration, when, for example, the device information is for another device other than the MFP 1, the MFP 1 will report an error, and the user can immediately notice the mistake and redo the operation.

Figure 6:
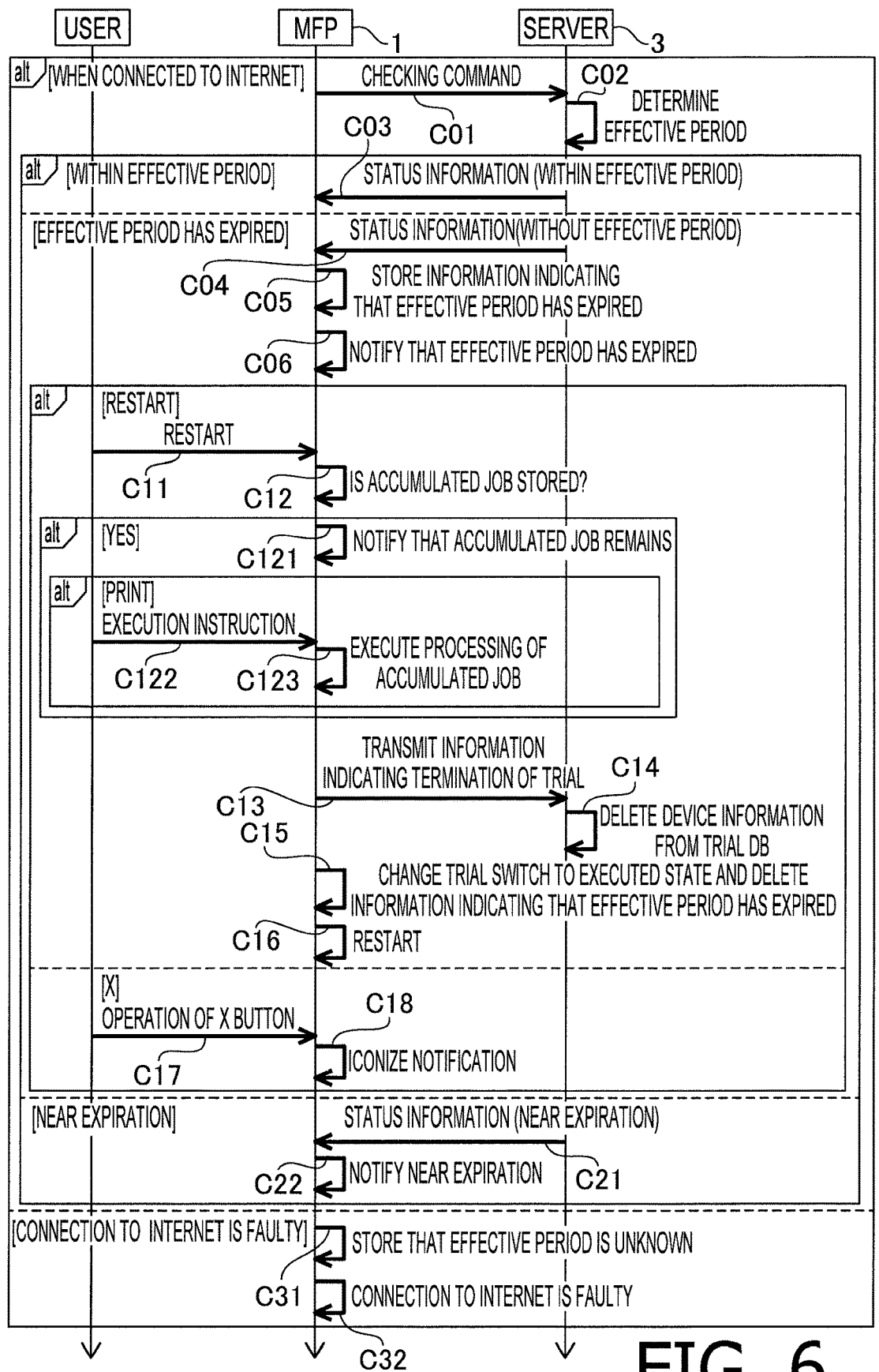
FIG. 6 is a sequence diagram illustrating an example of a procedure of checking an effective period of the trial mode.

Next, a management of the effective period of the trial mode will be described. The trial mode is a mode that can be used only for a particular effective period for each device. In the present embodiment, the effective period of the trial mode is managed by the server 3. The procedure of a period management within the effective period of the trial mode will be explained with reference to the sequence diagram in FIG. 6.

Within the period of the trial mode, i.e., in a state where the trial switch 28 is turned on, the MFP 1 repeatedly accesses the server 3 via the Internet 200 at a particular periodic timing (e.g., once a day, every few hours, or the like), and transmits a checking command to the server 3 to check whether it is currently within the effective period (C01). It is noted that the process in C01 is an example of a determining process. The timing at which the MFP 1 transmits the checking command (C01) is an example of a first timing. It is noted that the checking command transmitted by the MFP 1 includes the identification information of the MFP 1.

When the server 3 receives the checking command, the server 3 reads the trial start date and the trial end date stored, in association with the identification information included in the checking command, in the trial DB 43 and compares the read dates and times with the current date and time to determine whether or not it is currently within the effective period of the trial mode (C02). Then, the server 3 transmits the status information indicating the determination result of the determination in C02 to the MFP 1, which is the device that transmitted the checking command to the server 3.

The server 3 according to the present embodiment has three types of status information to respond to the checking command, and in C02, the server 3 determines which of the three types of status information is to be transmitted. The status information transmitted from the server 3 includes status information indicating that it is currently within the effective period, status information indicating that the effective period has already expired and it is outside the effective period (i.e., not within the effective period), and status information indicating that a remaining effective period is within a particular period and the effective period is about to expire (i.e., the current time is near the expiration of the effective period).

When the server 3 determines that it is currently within the effective period, the server 3 transmits the status information indicating that it is currently within the effective period to MFP 1 (C03). When it is within the effective period, the MFP 1 keeps operating in the trial mode, and the user of the MFP 1 can try all the additional functions as many times as he/she wants.

When the server 3 determines that the effective period has expired, the server 3 transmits the status information indicating that the effective period has expired to the MFP 1 (C04). When the MFP 1 receives the status information indicating that the effective period has expired, the MFP 1 stores the status information indicating that the effective period has expired in the memory 12 (C05). When the information indicating that the effective period has expired, the MFP 1 notifies information indicating that the trial mode is terminated (C06) when, for example, the MFP 1 displays the home screen 50 (see FIG. 3). It is noted that the process in C06 is an example of a first notification process.

Figure 7A:
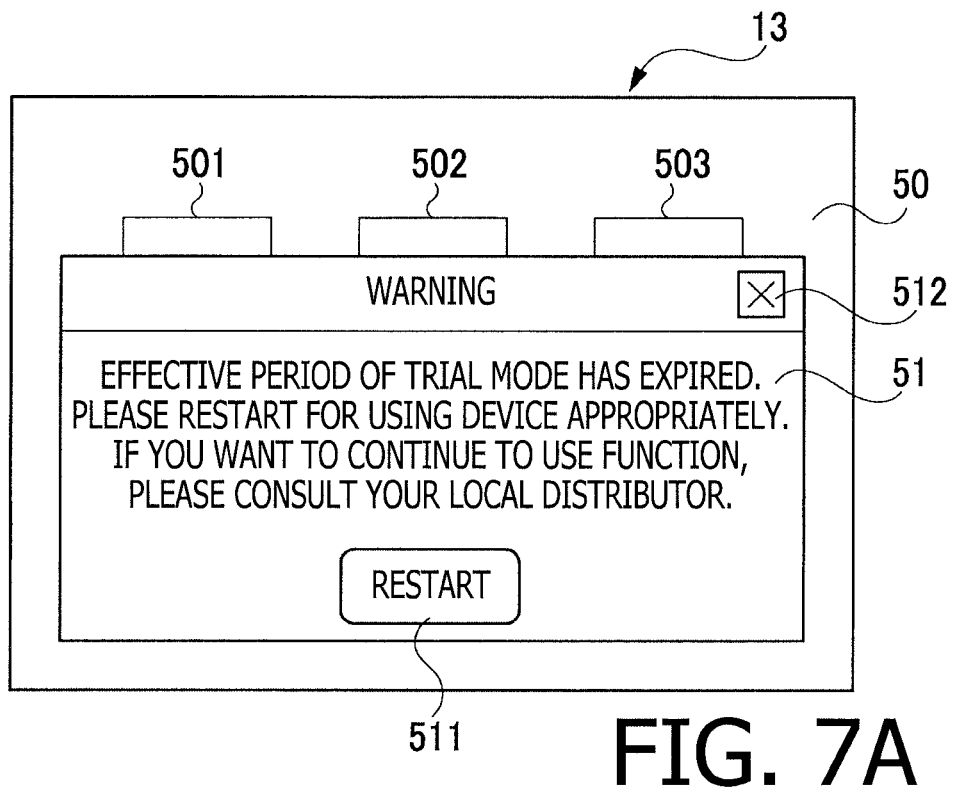
FIGS. 7A and 7B show examples of a notification screen outside the effective period of the trial mode.
Figure 7B:
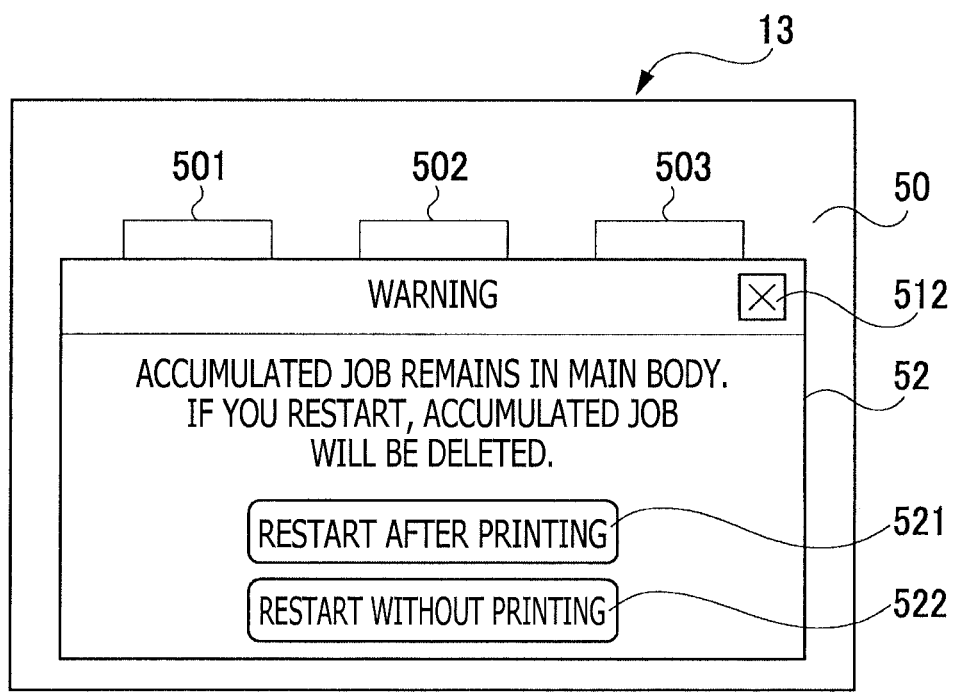

Examples of notifications when the current time is outside the effective period (after expiration of the effective period) in FIGS. 7A and 7B. In C06 of FIG. 6, the MFP 1 displays a notification screen 51 as shown in FIG. 7A so as to cover a large portion of the home screen 50 to notify that the effective period has expired. The notification screen 51 is an example of the first notification process.

The notification screen 51 displayed to cover a large portion of the home screen 50 restricts the operation of the buttons 501-503 configured to receive the selection of the type of processing on the home screen 50. For example, each of the buttons 501-503 may be unselectable due to the display of the notification screen 51. By restricting the operation to the home screen 50, it is possible to ensure that the user is aware that the effective period of the trial mode has terminated. In addition to the display of the notification screen 51, the notification in C06 may be a display of a warning mark or a notification by voice guidance.

As shown in FIG. 7A, the notification screen 51 includes a button 511 that receives an instruction for restarting, and an "X" button 512 that receives an instruction for iconizing the notification. The user must first operate either of the button 511 or the button 512 in order to use the MFP 1. It is noted that the instruction to restart is also an instruction to terminate the trial mode. After restart of the MFP 1, the trial mode is terminated and the use can use the MFP 10, appropriately.

When the MFP 1 receives an instruction to restart as the button 511 on the notification screen 51 is operated (C11), the MFP 1 determines whether an accumulated job is stored in the memory 12 (C12). The accumulated job is a job that contains instructions not to be processed until a user's operation to the user IF 13 is received, or a job for which an execution time is specified. When the MFP 1 has only received an accumulated job and has not executed the same, the accumulated job remains stored in the memory 12. Since the MFP 1 stores the accumulated job in a volatile memory such as a RAM, the stored accumulated job is erased when the MFP 1 is restarted. Thereby, for example, an unnecessary job of the additional function generated during the trial mode is deleted by the restart.

When the MFP 1 determines that the accumulated job is stored, the MFP 1 performs a notification notifying that the accumulated job remains (C121). For example, the MFP 1 changes the notification screen 51 displayed at C06 to a notification screen 52 that informs that the accumulated job remains, as shown in FIG. 7B. The notification screen 52 is an example of a case where a print job is stored as the accumulated job, and the notification screen 52 includes a button 521 to receive an instruction to print and restart, and a button 522 to receive an instruction to restart without printing. The MFP 1 then waits until an instruction through the button 521 or 522 is received.

When the MFP 1 receives an instruction to execute the processing of the accumulated jobs and restart by the user's operation of the button 521 (C122), the MFP 1 executes the processing of all the accumulated jobs stored in memory 12 (C123). After C123, or when an instruction to restart without executing the accumulated job is received, or when it is determined that no accumulated job is stored, the MFP 1 terminates the trial mode. It is noted that the series of processes including C12 to C123 for processing and printing the accumulated job may be regarded as the accumulated job function. Further, in C122, a print instruction of a print job for the secure print function may be received. In C123, a print job for the secure print function may be printed.

As a procedure to terminate the trial mode, the MFP 1 transmits information instructing termination of the trial (hereinafter, referred to as trial termination) including the identification information of the MFP 1 itself to the server 3 (C13). The server 3 deletes the information of the MFP 1 stored in the trial DB 43 based on the received information of the trial termination (C14). In addition, the MFP 1 makes a setting to change the trial switch 28 to the executed state, and deletes the information indicating that the current time is out of the effective period stored in C05 (C15). It is noted that a process in C15 is an example of a termination process. Then, the MFP 1 is restarted (C16). By the restart, the change of the trial switch 28 is reflected and the MFP 1 will not be set in the trial mode again. The timing of the termination procedure of the trial mode according to C13 to C16 is an example of a second timing.

Figure 8:
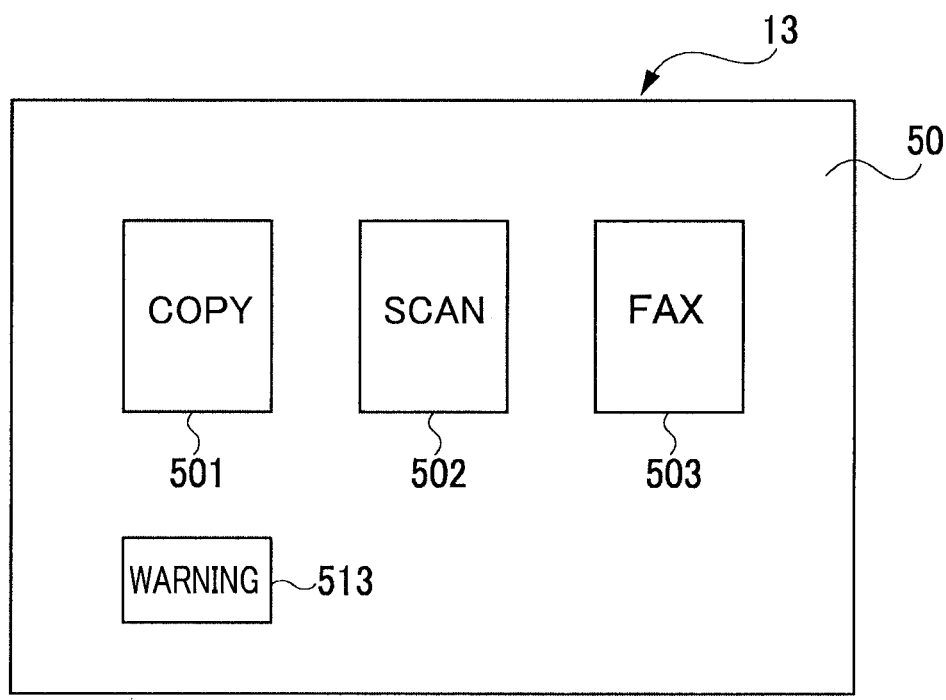
FIG. 8 shows an example of a modified notification to notify the outside the effective period of the trial mode.

When the MFP 1 receives an instruction to iconize the notification by operating the "X" button 512 on the notification screen 51 (C17), the MFP 1 displays an iconized notification screen 513 (C18), for example, as shown in FIG. 8, from the notification screen 51. The iconized notification is an example of notification in a manner in which the degree of notification is weaker than that of the notification by the screen 51. The notification screens 51 and 52 shown in FIG. 7 are examples of the first type, and the iconized notification screen 513 is an example of the second type. The instruction to iconize the notification by operating the "X" button 512 is an example of an instruction to switch the mode of the notification.

The "X" button 512 may also be displayed on the notification screen 52 when there is an accumulated job, and the MFP 1 executes the process of C18 even when the operation to the button 512 is received on the notification screen 52. In C18, instead of iconizing the notification screen 52, the MFP 1 may once stop displaying the notification screens 51 and 52 and display the home screen 50 without including the notification screens 51 and 52. In this case, an operation of the "X" button 512 is an example of a stop instruction. By iconizing or stopping the notification, the restriction on the operation of the home screen 50 is released, and the user can operate the buttons 501 to 503 in the home screen 50 to cause the MFP 1 to execute a process. Instead of iconizing or stopping the notification, the amount of the message may be reduced, the font size of the message may be reduced, or the volume of the voice message may be reduced.

Even when the operation of the home screen 50 is received by iconizing or stopping the notification screens 51 and 52 in C18, since the trial mode has not yet terminated, the user can still try each additional function. However, when, for example, the execution of the process instructed by the user has been completed, in order to display the home screen 50 again without being restarted, the MFP 1 displays the large notification screen 51 in the home screen 50 as shown in FIGS. 7 and 7B.

On the other hand, when the server 3 determines in C02 that the current time is near the expiration of the effective period, the server 3 transmits the status information indicating the near end of the effective period to the MFP 1 (C21). When receiving the status information indicating the near end of the expiration of the effective period, the MFP 1 notifies information indicating that the trial mode will be terminated shortly when, for example, the home screen 50 is displayed (C22). The process in C22 is an example of the third informing process.

Figure 9:
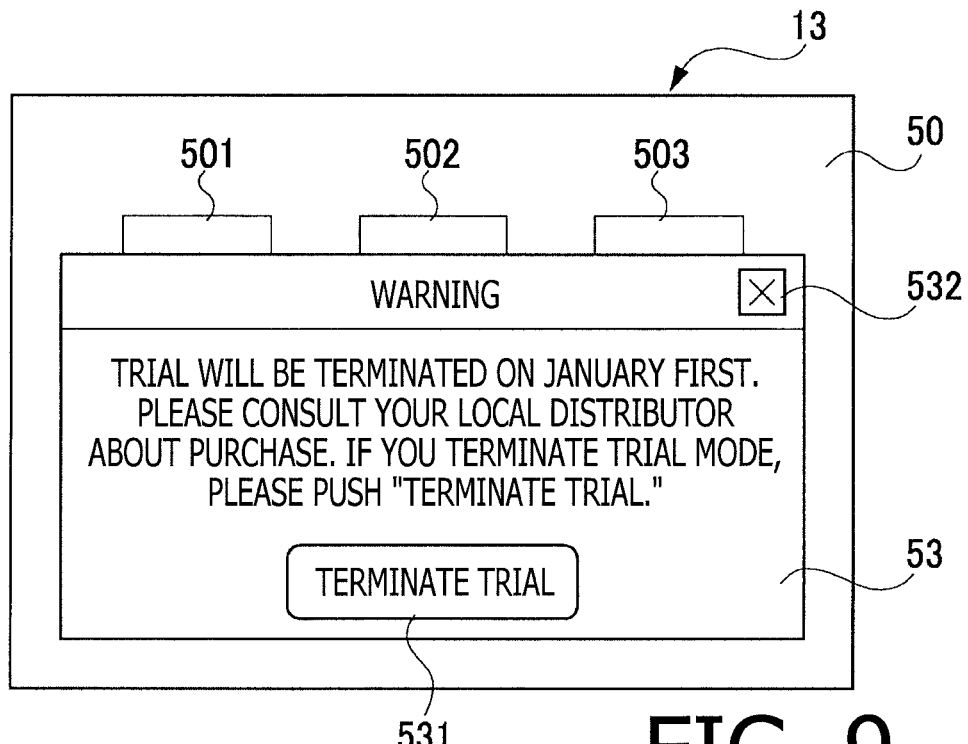
FIG. 9 shows an example of the notification screen close to the end of the effective period of the trial mode.

FIG. 9 shows an example of the notification indicating the near the expiration of the effective period. When displaying the home screen 50, the MFP 1 displays the notification screen 53 notifying that the current time is close to the effective period as shown in FIG. 9. The notification screen 53 is an example of the third notification. In the notification screen 53, the remaining time of the trial mode may be displayed.

The notification screen 53 includes the button 531 that receives the instruction to terminate the trial and the "X" button 532 that receives the instruction to terminate the notification. Unlike the notification screen 51, the notification screen 53 may be displayed for a fixed period of time and then the display is automatically terminated. In such a case, however, it is preferable to display the screen in a conspicuous manner, such as displaying the same in the center of the home screen 50, flashing the same at a corner, or the like, so that the notification screen 53 will not be overlooked.

When the user operates the button 531 and the MFP 1 receives an instruction to terminate the trial mode, the MFP 1 executes the termination procedure in the same way as when the MFP 1 receives an instruction to restart outside the effective period. Concretely, the MFP 1 transmits the information indicating the termination of the trial to the server 3 and sets the trial switch 28 to the executed state. Then, the server 3 updates the trial DB 43. In this case, if the MFP 1 stores the accumulated jobs, the MFP 1 may display the notification screen 52 to notify the accumulated jobs and receive an instructions from the user, as described above.

When the MFP 1 receives an instruction to terminate the notification as the user operates the "X" button 532 on the notification screen 53, the MFP 1 stops displaying the notification screen 53. At a next confirmation of the effective period, if the current time is near the expiration of the effective period again, the notification screen 53 is displayed again.

If the MFP 1 is not connected to the Internet 200, the MFP 1 cannot transmit the checking command in C01 and cannot receive the status information from the server 3. In such a state, it is impossible for MFP 1 to check the effective period. That is, if the MFP 1 cannot receive the status information from server 3 at the timing of transmitting the checking command to server 3, the MFP 1 stores, in memory 12, unknown information indicating that the effective period of the trial mode is unknown (C31). Further, the MFP 1 notifies information indicating that the connection to the Internet 200 is faulty (C32). It is noted that a process in C32 is an example of the second reporting process.

Figure 10:
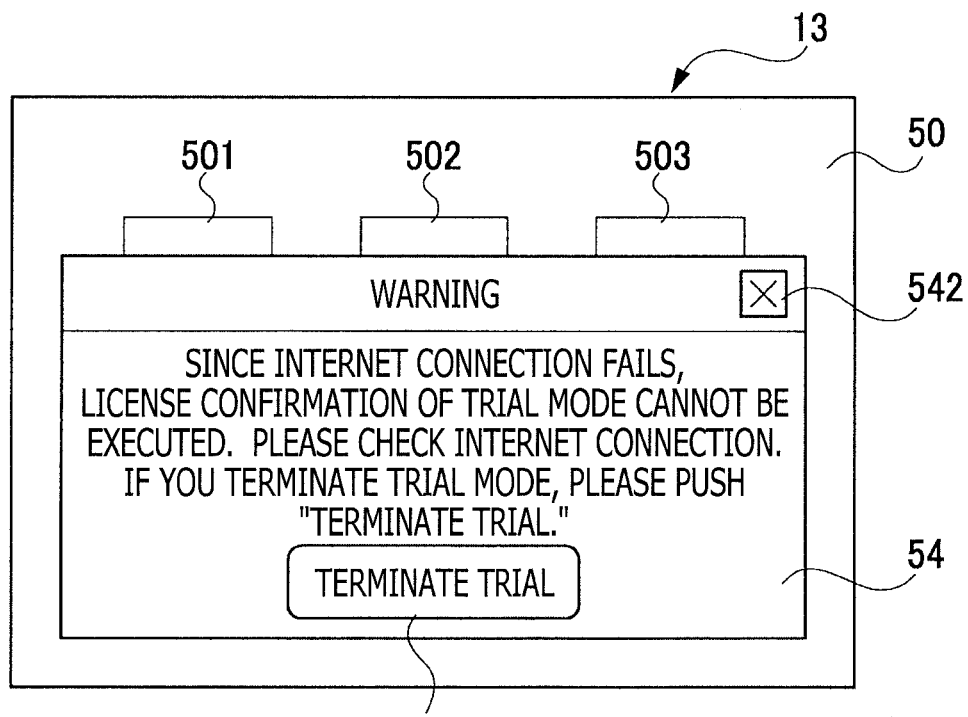
FIG. 10 shows an example of a notification screen notifying a poor connection to the Internet.

An example of a report notifying a poor connection is shown in FIG. 10. When displaying the home screen 50, the MFP 1 displays, for example, a notification screen 54 notifying that the MFP 1 is not connected to the Internet 200 as shown in FIG. 10. The notification screen 54 is an example of the second notification. The notification screen 54 includes a button 541 that accepts instructions to end the trial, and an "X" button 542 that accepts instructions to iconize or stop the notification. The notification screen 54, like the notification screen 51, is displayed in a manner that restricts operation to the home screen 50. The user must operate one of these buttons 541 and 542 in order to use the MFP 1.

When the MFP 1 receives an instruction to terminate the trial mode as the button 541 is operated, the MFP 1 executes the termination procedure. However, since the MFP 1 is not connected to the Internet 200, the MFP 1 may store the fact that the termination instruction was received and transmit the information of the termination of the trial mode to the server 3 after the connection is restored. In this case, when the MFP 1 stores the accumulated jobs, the MFP 1 displays the notification screen 52 notifying the user of the accumulated jobs and receives the user's instruction, as described above. Further, the MFP 1 deletes unknown information stored in C31 and sets the trial switch 28 to the executed state.

On the other hand, when the MFP 1 receives an instruction to iconize or terminate the notification in response to the user's operation of the "X" button 542 on the notification screen 54, the MFP 1 iconizes or terminates the display of the notification screen 54. Thus, the user can operate the home screen 50. Thereafter, when displaying the home screen 50, the MFP 1 displays the notification screen 54 when the unknown information stored in C31 is stored, and the notification screen 51 when the out-of-period information stored in C05 is stored.

When the unknown information stored in C31 is stored, the MFP 1 periodically attempts to connect to the Internet 200. In this case, the MFP 1 may be configured to attempt to connect to the Internet more frequently than a frequency of transmitting the checking command to the server 3. When the connection to the Internet 200 is restored, the MFP 1 transmits the checking command to the server 3 regardless of the particular transmission timing, which has been defined in advance, of transmitting the checking command. When the MFP 1 can receive status information from the server 3, the MFP 1 deletes the unknown information and performs a process according to the type of the received status information.

The MFP 1 may be configured to continue to restrict the use of the trial mode when the status information cannot be received from the server 3. For example, the MFP 1 may be configured not to receive the operation to the "X" button 542 of the notification screen 54 until the connection to the Internet 200 is restored. In addition, on the notification screen 54 displayed in C32, the MFP 1 may display not only a notification notifying that the connection to the Internet 200 is not established, but also notifications notifying, for example, that a communication with the server 3 is abnormal, that a failure of the trial mode is occurring, and that the use of the trial mode is restricted.

Figure 11:
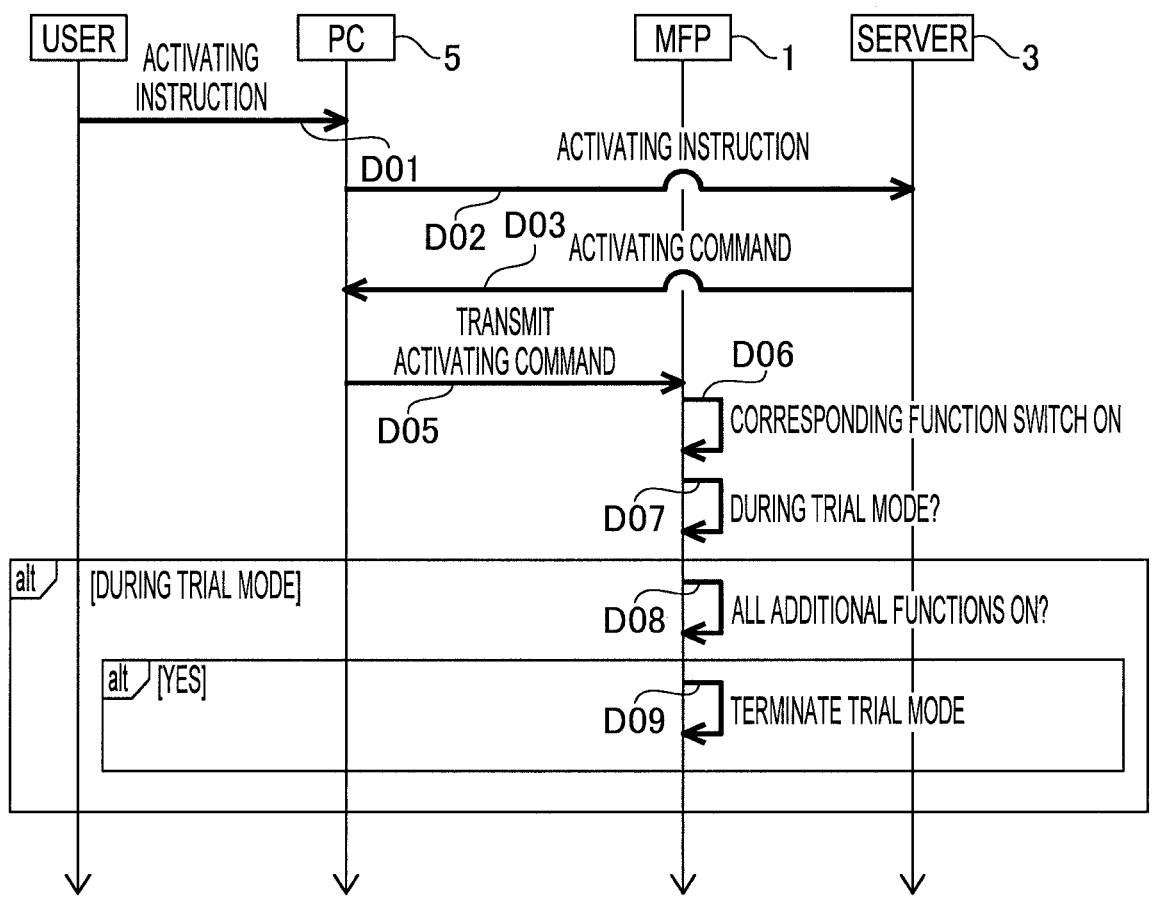
FIG. 11 is a sequence diagram illustrating an example of a procedure of activating an additional function.

Next, the procedure of activating additional functions of the MFP 1 will be described with reference to the sequence diagram shown in FIG. 11. When the user of the MFP 1 makes a contract for activating additional functions, and a salesperson or the like performs a procedure of activating additional functions of the MFP 1 using, for example, the PC 5. The PC 5 shown in FIG. 11 is a device equipped with an application for activating the additional functions, and may be the same device as the PC 5 in FIG. 5, or may be a different device.

The user of the PC 5 starts an application for activating the additional functions on the PC 5, designates a type of the additional function to be activated and the identification information of the MFP 1, and inputs an activating instruction to the application of the PC 5 (D01). The PC 5 accesses the server 3 and transmits the information of the activating instructions as received (D02). The server 3 generates an activating command based on the received activating instructions and transmits the generated activating command to the PC 5 (D03). The activating command contains the identification information of the MFP 1. The server 3 may be configured to store the activating information in the memory 32.

The application of the PC 5 transmits the received activating command to the MFP 1 (D05). Thus, the activating command is input to the MFP 1. The MFP 1 turns on the corresponding function switches 25 to 27 based on the input activating command (D06). It is noted that a process in D06 is an example of an activating process.

The procedures from D02 to D06 may be performed in the same way as the procedure for starting the trial mode, where the activating instructions may be transmitted from the MFP 1 to the server 3, and the server 3 may transmit the activating commands to the MFP 1. Further, the activating command received by the PC 5 may be entered into the MFP 1 via, for example, a USB memory, or may be entered into the MFP 1 by a manual operation by a person in charge.

When the MFP 1 receives the input of the activating command, the MFP 1 determines whether the current time is within the period of the trial mode (D07). When it is judged that the current time is within the period of the trial mode, the MFP 1 determines whether all the function switches 25 to 27 of the additional functions have been turned on by the activating at this time (D08). When it is determined that all the additional functions have been activated, the MFP 1 terminates the trial mode (D09). Concretely, the MFP 1 transmits the information indicating the termination of the trial mode to the server 3 and changes the trial switch 28 of the MFP 1 to the executed state. When the out-of-period information or the unknown information is stored, the MFP 1 deletes such information as well. In response to receipt of the information indicating the termination of the trial mode, the server 3 deletes the information stored in the trial DB 43.

When all the additional functions have been activating, the MFP 1 terminates the trial mode and does not check the effective period thereafter. In a case where there are one or more additional functions that have not been activated, the MFP 1 continues the trial mode.

As described in detail above, according to the image processing system 100 of the present embodiment, the MFP 1 has the trial mode, and within the period of the trial mode, all the additional functions can be tried. Accordingly, the user of the MFP 1 can try the additional functions without entering into the contract. Further, when the MFP 1 determines that the current time is out of the period of the trial mode, the MFP 1 displays the notification screen 51 on the home screen 50. Accordingly, the user can be aware of the termination of trial mode and avoid unexpectedly losing access to additional functions.

Further, according to the present embodiment, since the server 3 manages the effective period of the trial mode, it is possible to prevent fraud by changing the time setting of the MFP 1 and the like and to set the effective period appropriately. Furthermore, according to the present embodiment, when it is determined by the server 3 that current time is out of the effective period for the trial mode, the notification screen 51 is displayed every time the home screen 50 is displayed. Therefore, the termination of the trial mode is frequently notified, thereby encouraging the operation to terminate the trial mode.

Still further, according to the present embodiment, since all the multiple additional functions can be tried in the trial mode, the management of the effective period for individual additional functions becomes unnecessary, and the load for management of the effective period is small. In addition, since all the additional functions can be used, it becomes possible for the user to conduct more trials, which is convenient for the user. Further, since the trial switch 28 is provided separately from function switches 25 to 27 according to the present embodiment, each of the function switches 25 to 27 can be activated independently even during the trial mode. In addition, even if the activation of some of the additional functions is instructed, the trial mode is not terminated, and the user can use the additional functions that have not been activated. Therefore, it is easy for the user to try and evaluate the multiple additional functions.

Still further, according to the present embodiment, the MFP 1 or the PC 5 transmits the start request to the server 3. When the MFP 1 itself transmits the start request and receives the start command, the trial mode can be set up in the MFP 1 without separately preparing a device in which a dedicated application for accessing the server 3 is installed. When the PC 5 transmits the start request to the server 3 using the application, the start request of the trial mode for multiple devices including the MFP 1 can be made from a single PC 5, and the setup or the trial mode for the multiple devices becomes less troublesome.

Further, according to the present embodiment, since the trial mode is terminated when the user's termination instruction is received on each notification screen, the possibility that the trial mode is terminated in the middle of executing a job that uses an additional function can be reduced. Furthermore, when the accumulated jobs are stored in the memory 12, the user is notified and the user can instruct whether to execute the accumulated jobs or not before restarting. Accordingly, the user can be aware that the stored job will be deleted by the restart and can terminate the trial mode appropriately.

Further, according to the present embodiment, since the MFP 1 periodically accesses the server 3 to check the effective period, the effective period of the trial mode can be strictly managed. In addition, when the end of the effective period is near, the user can be aware that the expiration of the trial mode is imminent since the end of the effective period is notified.

Still further, according to the present embodiment, when the status information cannot be received from the server 3, the user can recognize a communication abnormality since the notification screen 54 indicating the poor connection is displayed. Furthermore, according to the present embodiment, since the notification screen 54 is displayed when the home screen 50 is displayed, the communication abnormality is frequently notified, which may prompt the user to perfume an operation to resolve the communication abnormality. Further, since the trial mode is maintained even in a case where the communication with the server 3 is abnormal and the effective period of the trial mode cannot be determined, the possibility of the trial mode being terminated in the middle of executing a job that uses the additional function can be reduced. Furthermore, when the communication with the server 3 is recovered after notifying the abnormality in communication with the server 3, the notification of the notification screen 54 is discontinued. Therefore, the user can recognize the recovery of communication and the annoyance caused by the reporting is eliminated.

Figure 12:
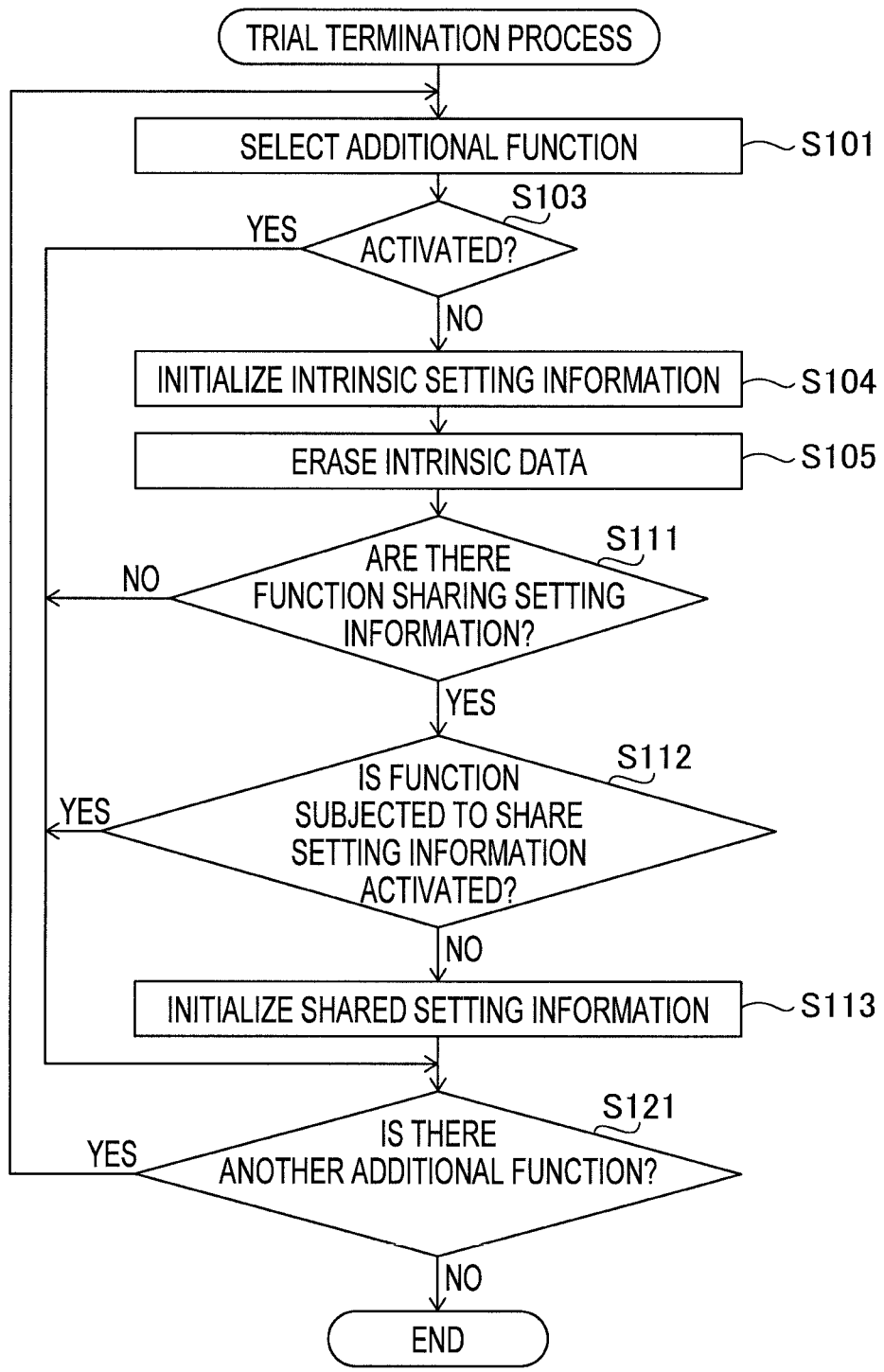
FIG. 12 shows a flowchart illustrating a trial termination process.

Next, the procedure of terminating the trial mode in the MFP 1 according to the present embodiment will be described. Firstly, a procedure of a trial termination process, which is the process at the time of termination of the trial mode, will be described with reference to a flowchart shown in FIG. 12. The trial termination process is executed by the CPU 11 of the MFP 1 in response to receipt of the restart instruction in a state where the current time is outside the effective period. The trial termination process in FIG. 12 is executed between C11 and C12 in FIG. 6, or after C12 to C123 but before C13.

As described above, there are multiple additional functions that can be tried by activating the trial mode. Such functions include, for example, a secure print function, a custom UI function, a barcode print function, and a cloud storage function. In the trial termination process, the CPU 11 sequentially performs various processes for termination of the plurality of additional functions that can be tried in the trial mode. For this purpose, the CPU 11 first selects one of the additional functions (S101).

Then, the CPU 11 determines whether the additional function selected in S101 has been activated (S103). When the additional function has been activated within the effective period of the trial mode, one of the switches among the function switches 25 to 27 corresponding to the additional function has been turned on, as described above. The information indicated by the state of each of the function switches 25-27 is an example of functional information for each type of additional function. Information indicating that a function switch is in the on state is an example of information indicating that the function is activated, and information indicating that a function switch is in the off state is an example of information indicating that the function is inactivated. In addition, as described above, the process (D06 in FIG. 11) in which the MFP 1 turns on the relevant ones of the function switches 25 to 27 by receiving the user's instruction to activate the same is an example of the changing process.

When it is determined that the selected additional function has not been activate (S103: NO), the CPU 11 initializes setting information intrinsic to the additional function (S104). Further, the CPU 11 erases the data intrinsic to the additional function (S105). The steps S104 and S105 are examples of an initialization process.

The intrinsic setting information is information that is used only for using the selected additional function, and is stored in the memory 12 in association with the additional function. When the MFP 1 receives the execution instruction for the additional function selectively displayed in A14. In A15, for example, the MFP 1 receives an instruction input to set the setting information used in the additional function based on an operation to the user IF 13. A process in A15 of FIG. 2 an example of an inputting process. Based on the received instruction, the MFP 1 stores the setting information in a non-volatile area of the memory 12, and reads and uses the stored setting information in association with the additional function when the additional function is executed (for example, in A16 of FIG. 2).

In some additional functions, intrinsic data used only for the additional function is obtained through user input or a communication with external devices or the like, and stored in the memory 12, and the data is read and used when the additional function is executed. In other words, the intrinsic setting information or intrinsic data is information that is used only for the selected additional function and not for any other functions. The details of the intrinsic setting information and the intrinsic data will be described later.

The functions that have not been activated become unavailable after the trial mode is terminated. Therefore, the intrinsic setting information or the intrinsic data stored in the memory 12 corresponding to the function will not be used either thereafter. Since a risk of information leakage increases if the unused information remains in the memory 12, the MFP 1 initializes the setting information intrinsic to the function that is not activated when the trial mode has been terminated and erases the intrinsic data. Further, by erasing the intrinsic data, the MFP 1 reduces the load to the memory 12.

Next, the CPU 11 determines whether the selected additional function is a function that uses setting information shared with other functions (S111). The setting information includes information that is shared by multiple functions. Even though the selected additional function is not activated, when other functions that share the information are activated, the setting information will be used thereafter. Therefore, when it is determined that there is a function that shares information with another function (S111: YES), the CPU 11 determines whether the other function that is subjected to share the setting information is activated (S112). When it is determined that the other function sharing the setting information with the selected additional function is activated (S112: NO), the CPU 11 initializes the shared setting information and the shared data (S113). It is noted that a process in S113 is an example of the initialization process.

After execution of S113, when it is determined that the selected function is activated (S103: YES), when it is determined that there is no function that shares the information (S111: NO), or when it is determined that the other function which sharing the selected function is activated (S112: YES), the CPU 11 determines whether there is an additional function that has not yet been selected (S121). In a case where it is determined that there is an unselected additional function (S121: YES), the CPU 11 returns to S101 to select the next additional function and perform the same process. When it is determined that there are no unselected additional functions (S121: NO), that is, when it is determined that the processing for all additional functions has been completed, the CPU 11 terminates the trial termination process.

It is preferable that the activated function remains available after the termination of the trial mode. For example, it is preferable that the setting information received within the effective period of the trial mode remains available continuously even after the termination of the trial mode. Further, if there is a function to share the setting information and that function is effective, that setting information should be remained continuously available even after the termination of the trial mode. Therefore, when the selected additional function is activated or the function for sharing the information is activated, the CPU 11 does not perform the process of S104 or S105 even if the setting information and data are stored in the memory 12. When the additional function is activated, the MFP 1 can not only continue to receive instructions to execute the additional function, but also continue to receive the addition or change of the setting information for the additional function.

Next, each additional function will be explained in detail. Firstly, the "cloud save" function will be described. The cloud save is a function of storing scan data obtained by reading (scanning) an original document in a designated storage destination such as a cloud. When the MFP 1 receives an instruction to use the cloud saving function within the effective period of the trial mode, the MFP 1 receives the input of the address designating the destination of the scanned data and the authentication information for storing. The MFP 1 accepts the input of the address indicating the destination of the scanned data and the authentication information for saving, stores the information in the memory 12, and uses the same when executing the cloud saving function.

The cloud save function is a function that uses intrinsic setting information and intrinsic data. In the trial termination process, when the selected additional function is the cloud save function and the cloud save function has not been activated, the CPU 11 initializes the information indicating the storage destination in S104 or S105. Concretely, the CPU 11 erases the address information or the authentication information, changes the addresses to initial addresses which have been set in advance, and the like.

Next, the "custom UI" function will be explained. The custom UI function is a function to change a display form of the UI screen displayed on the user IF 13 of the MFP 1 to receive the user operations from the default display form. When the MFP 1 receives an instruction to use the custom UI function, the MFP 1 obtains, for example, the data for the custom UI provided by the vendor and stores the received information in the memory 12 as setting information and data intrinsic to the custom UI function. Then, in a case where the data for the custom UI is stored in the memory 12 when the UI screen is displayed, the MFP 1 reads the data and displays the UI screen based on the read data. The data intrinsic to the custom UI function includes, for example, data of icons, data of background images, and fonts of characters displayed on the UI screen.

In the trial termination process, in a case where the selected additional function is the custom UI function and the custom UI function has not been activated, the CPU 11 initializes the setting information for the custom UI stored in the memory 12 and erases various data obtained for the custom UI in S104 and S105. In the custom UI function, the user's selection may be accepted from, for example, multiple types of icons or the like. In such a case, information indicating the type of icons to be used is the setting information intrinsic to the custom UI function. In a case where the custom UI function is not activated, the CPU 11 may reset the icon to the default setting by initializing the information indicating the icon to be used in S104.

Next, the "secure print" function will be explained. The secure print function is a function to accumulate print jobs to each of which information for authentication is added, and perform printing. The MFP 1 according to the present embodiment has a first secure print function (hereinafter, referred to as a "first SP function") as a basic function, and, as additional functions, a second secure print function (hereinafter, referred to as a "second SP function") and a third secure print function (hereinafter, referred to as a "third SP function"). It is noted that a print job for the first SP function is an example of the accumulated job shown in FIG. 6, and a print job for the second SP function is an example of the accumulated job shown in FIG. 6. Further, the first SP function is an example of the secure print function, the second SP function is an example of the secure print function, and the third SP function is an example of the secure print function.

The three secure print functions are mutually exclusive, and the MFP 1 activates only one of the three secure print functions. The second SP function and the third SP function are examples of a first exclusive special function and a second exclusive special function, respectively, and the first SP function is an example of a particular function that has already been activated when the MFP 1 is shipped from the factory. During the effective period of the trial mode, the MFP 1 can use any of the second SP function and the third SP function. When the MFP 1 starts the trial mode (e.g., A06 in FIG. 2), the MFP 1 stores information to activate the second SP function in the non-volatile storage area of memory 12, and inactivates the first SP function and the third SP function. Then, when the current time is within the effective period of the trial mode, the MFP 1 receives an instruction to switch to activate either one of the second SP function and the third SP function as the user operates the user IF 13. Then, when the selection to activate one of the second SP function and the third SP function is received, the MFP 1 activates one of them and inactivates the other.

Figures 13, 14:
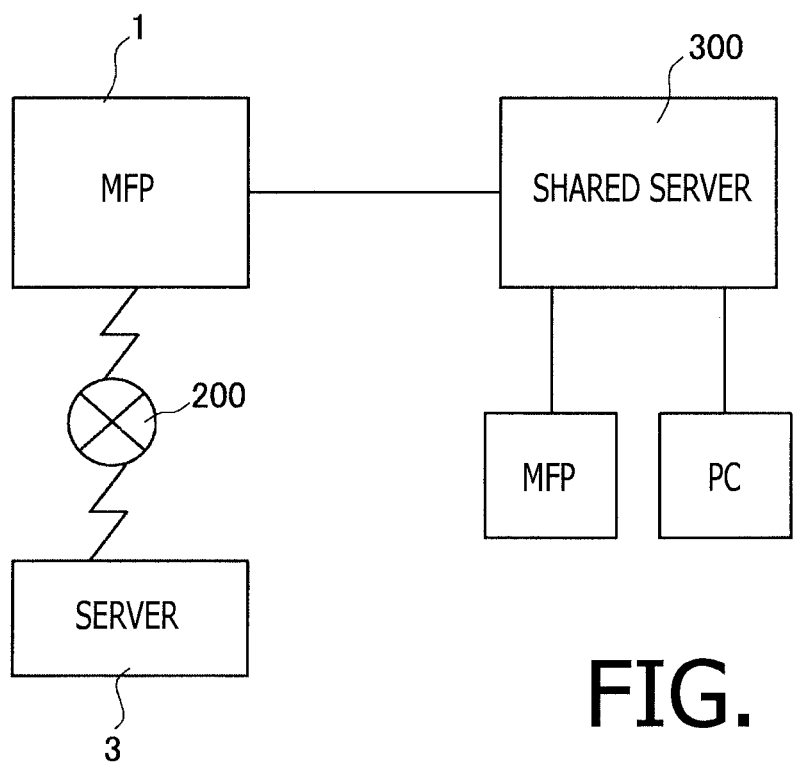
FIG. 13 illustrates differences between three types of SP functions.
FIG. 14 is a block diagram schematically showing a configuration of an image processing system.

In processing a print job using the secure print function, the MFP 1 determines the execution condition based on the input operation to the user IF 13. When the MFP 1 determines that the execution condition is satisfied, the MFP 1 can execute printing based on the image data contained in the accumulated print job. The first SP function, the second SP function, and the third SP function differ, for example, in terms of execution conditions and print job accumulated locations, as shown in FIG. 13. The execution condition in FIG. 13 may be, for example, a condition under which the selection of the print job can be received. The MFP 1 may be configured to receive the selection of a print job after the execution condition in FIG. 13 is satisfied, or may be configured to determine the execution condition after the selection of a print job is received.

Next, a location where the print jobs are accumulated in connection with each secure print function will be described. Both the first SP function and the second SP function are functions to read and print a print job stored in the memory 12 of the MFP 1. When the MFP 1 receives a print job that uses the first SP function or the second SP function in a state where the first SP function or the second SP function is activated, the MFP 1 stores the print job in the memory 12 and does not print the same until the execution conditions are met. The first SP function and the second SP function are examples of an accumulated job function. A print job stored in the memory 12 using the first SP function or the second SP function is an example of a first job.

The print job using the first SP function or the second SP function may be stored in a volatile storage area or a non-volatile storage area in the memory 12. Further, the MFP 1 can also receive a setting to store the print job in an external device locally connected to the MFP 1, such as a USB memory. The MFP 1 is configured to receive the setting of the storage destination information representing a setting of a storage location of the print job (e.g., in the memory 12 of the MFP 1, in the USB memory or the like) as the setting information of the first SP function or the second SP function. The storage destination information indicating the storage location of the print job is the setting information shared by the first SP function and the second SP function.

On the other hand, the third SP function is a function to read a print job stored not in the memory 12 of the MFP 1 but in an external device connected via a network, and to perform printing. The MFP 1 is configured to be connected to, for example, a shared server 300 as shown in FIG. 14. The shared server 300 is a device different from the server 3, and is a device that can be connected not only to the MFP 1 but also to other MFPs, PCs and the like, and is configured to store print jobs. The third SP function is an example of the server accumulated job function. The print job stored in the shared server 300 is an example of the second job. The print job using the third SP function is not passed directly to the MFP 1, but is passed to the shared server 300 from, for example, a PC or other device connected to the shared server 300, and is stored in the memory of the shared server 300.

When the MFP 1 receives an instruction to activate the third SP function, the MFP 1 receives input of connection information for communication with the shared server 300, which is an accumulation destination of the print jobs, and address information indicating a storage location of the print jobs, and stores the received information in the memory 12. The MFP 1 and the shared server 300 may be connected via the Internet 200 or via a local network. The access information of the shared server 300, including the connection information and address information, is information that is not used by the first SP function or the second SP function, and is an example of the setting information intrinsic to the third SP function.

There is information indicating retention periods of respective print jobs as the setting information shared between the first SP function, the second SP function and the third SP function. The MFP 1 receives the setting of the retention period of a print job that has been accumulated in the storage location other than the RAM in the memory 12 and has not met the execution conditions, and stores the information indicating the received retention period in the memory 12. When the MFP 1 determines that an elapsed time since the print job was accumulated has exceeded the set retention period, the MFP 1 deletes the print job without printing the same. The second SP function and the third SP function, which share the information of the retention period, are examples of a first sharing special function and a second sharing special function.

Next, execution conditions of respective secure print functions will be described. To a print job according to the first SP function, individual authentication information (e.g., a PIN code) is added to each job. When the authentication information is added to the print job for which the print instruction is received with the first SP function being activated, the MFP 1 receives the input of the authentication information by the user using the user IF 13 of the MFP 1. When the authentication information added to the print job and the authentication information input by the user match, the MFP 1 determines that the input authentication information is appropriate and the execution conditions are satisfied. The authentication information is an example of second input information, and the first SP function is an example of an accumulated job function according to a second method. In the first SP function, the MFP 1 receives the input of the authentication information after receiving the selection of the print job. Further, when it is determined that the execution condition is satisfied when the authentication information is determined to be appropriate.

User information indicating the user who instructed the printing is added to the print job according to the second SP function or the third SP function. In a state where the second SP function or the third SP function is activated, the MFP 1 receives a login input by the user using the user IF 13 of the MFP 1. The MFP 1 stores, in the non-volatile storage area of the memory 12, the login information for login authentication, for example, a combination of a user name and a password, and the MFP 1 performs the login authentication based on the received login input and the login information stored in the memory 12. The login input received in a state where the second SP function is activated is an example of first input information, and the second SP function is an example of an accumulated job function according to a first method.

When the login authentication is successful, the MFP 1 determines that the received login input is appropriate. When the login authentication is successful with the second SP function being activated, the MFP 1 is capable of receiving, for example, the selection of a print job to which the user information indicating the logged-in user is added and the instruction to execute printing. When the login authentication is successful with the third SP function being activated, the MFP 1 communicates with the shared server 300, and it becomes possible, for example, to receive the selection of a print job to which the user information indicating the logged-in user is added and the instruction to read a print job to which the user information indicating the logged-in user is added. In the second SP function or the third SP function, the MFP 1 determines that the execution condition is satisfied in a case where the login authentication is successful and the designation of the print job is received.

In the trial termination process, when the additional function selected in S101 is one of the secure print functions, in S103, the CPU 11 determines whether each of the selected secure print functions and the other secure print functions is activated. For example, when the selected additional function is the second SP function, the CPU 11 determines whether the second SP function or the third SP function is activated. As described above, since all the secure print functions are mutually exclusive, when neither the second SP function nor the third SP function is activated, the first SP function is activated as in the factory default state. Then, in a process after S104, the CPU 11 initializes information and deletes data, for example, as shown in FIG. 15.

When neither the second SP function nor the third SP function is activated at the time of execution of the trial termination process, the CPU 11 initializes the access information of the shared server 300, which is the setting information intrinsic to the third SP function, in S104, and erases the print jobs accumulated by the second SP function, which is the data intrinsic to the second SP function, in S105. In a case where the second SP function is not activated and a print job using the second SP function is accumulated in the memory 12, the CPU 11 erases the image data of the print job in S105. In this case, the process in S105 is an example of the erasing process. As described above, the MFP 1 may be configured to inform the user before erasing the print job (e.g., C121 in FIG. 6) and receive the user's instruction whether to execute the printing before the termination of the trial mode. In addition, the MFP 1 may be configured not to erase the print job when the print job to be erased is stored in a removable storage device such as a USB memory.

In a case where neither the second SP function nor the third SP function is activated at the time of execution of the trial termination process, since the first SP function is activated, the CPU 11 determines that the function that shares the information is activated in S112 regarding the storage destination information of the print job, which is the setting information shared by the first SP function and the second SP function, and does not initialize the storage destination information.

When the storage location of the print job indicated by the storage destination information is the RAM of the memory 12, the CPU 11 may initialize the information of the retention period. Since the retention period does not apply to the print jobs accumulated in the RAM, it is likely that the information regarding the retention period will not be used thereafter, and may be initialized to a particular period, for example, one day. When, for example, the login information is not used in any function other than the secure print functions, the CPU 11 may be configured to erase the login information stored in the memory 12 when neither the second SP function nor the third SP function is activated.

On the other hand, when the second SP function is activated, the CPU 11 initializes the access information of the shared server 300, which is the setting information intrinsic to the third SP function, and erases the print jobs accumulated by the first SP function, which is the data intrinsic to the first SP function. In this case, the CPU 11 does not initialize the storage destination information or the retention period information of the print job.

In a case where the second SP function, which is the selected additional function, is not activated and the third SP function is activated, the CPU 11 initializes the storage destination information of the print job, which is the setting information shared by the first SP function and the second SP function, since it is determined in S112 that the function sharing the setting information is not activated either. The CPU 11 sets the storage destination to a particular storage location, for example, the RAM of the memory 12. In addition, the CPU 11 erases the print job stored by the first SP function or the second SP function.

In the trial termination process, the CPU 11 does not erase the print job regardless of whichever secure print function is activated or even when the print job using the third SP function is stored in the shared server 300. When the third SP function is not activated when the trial mode is terminated, by executing the trial end process, the MFP 1 initializes the access information of the shared server 300, and thereafter, the print job cannot be read from the shared server 300. However, the shared server 300 can be connected to devices other than the MFP 1. For example, when the third SP function is activated in another MFP connected to the shared server 300, the print jobs stored in the shared server 300 can be printed by using the third SP function of the other MFP. Therefore, by not deleting the print job stored in the shared server 300, the problem of the other image processing apparatuses being unable to use the image data can be avoided.

At the time of switching between the second SP function and the third SP function within the effective period of the trial mode, the MFP 1 does not execute the trial termination process and does not initialize the setting information or erase the intrinsic data even if there is information intrinsic to the inactivated function. For example, when the instruction to activated the second SP function is received in a state where the third SP function is being activated within the effective period of the trial mode, the MFP 1 does not erase the connection information or the address information with the shared server 300 used in the third SP function. For another example, when the instruction to activate the third SP function is received in a state where the second SP function is being activated within the effective period of the trial mode, the MFP 1 does not erase the print job that uses the second SP function. Since there is a possibility that the instruction to switch the function will be received again within the effective period of the trial mode, troublesome operations of the user to re-enter the information can be avoided by not erasing the information.

Next, the "barcode printing" function will be described. The barcode printing function is a function of generating a barcode image based on a designated numeric string and prints the generated barcode image. In the barcode printing function, the MFP 1 does not use any intrinsic setting information or data, nor any shared setting information or data. Even when the MFP 1 receives an instruction to use the barcode printing function within the effective period of the trial mode, it does not receive any setting instruction or the like from the user, nor does it store any setting information in the memory 12. No setting information will be stored in memory 12. When the selected additional function is a function that does not use the setting information, such as the barcode printing function, the CPU 11 does not initialize the setting information or erase the data, regardless of whether the function is being activated or not.

Next, a process in a case where the state of the trial switch 28 of the MFP 1 (see FIG. 1) is changed during the effective period of the trial mode due to, for example, work by maintenance workers, will be described with reference to a sequence diagram shown in FIG. 16. As described above, when the MFP 1 receives the start command to start the trial mode (A05 in FIG. 2), the MFP 1 changed the trial switch 28 from off to on (A06). At the start of the sequence diagram in FIG. 16, the current time is within the effective period of the trial mode, and the trial switch 28 is turned on.

It is noted that the MFP 1 may receive an instruction to change the state of the trial switch 28 to off even within the effective period of the trial mode, for example, by an operation by an maintenance worker or the like (E01). As a result, the MFP 1 turns the trial switch 28 to the off state even though the MFP 1 has not received any information from the server 3 indicating that the current time is outside the effective period (E02). The MFP 1 may, for example, receive a command to forcibly turn off the trial switch 28, or may receive an operation to an internal hard switch that may also turn off the trial switch 28. The information indicating the state of the trial switch 28 is an example of trial mode information. The off state of the trial switch 28 is information indicating that the trial mode is inactivated, and the on state of the trial switch 28 is information indicating that the trial mode is activated. It is noted that the MFP 1 may be configured to receive instructions to change the state of the trial switch 28 through the user operation of the user IF 13 or by receiving a command from an external device.

Figure 2:
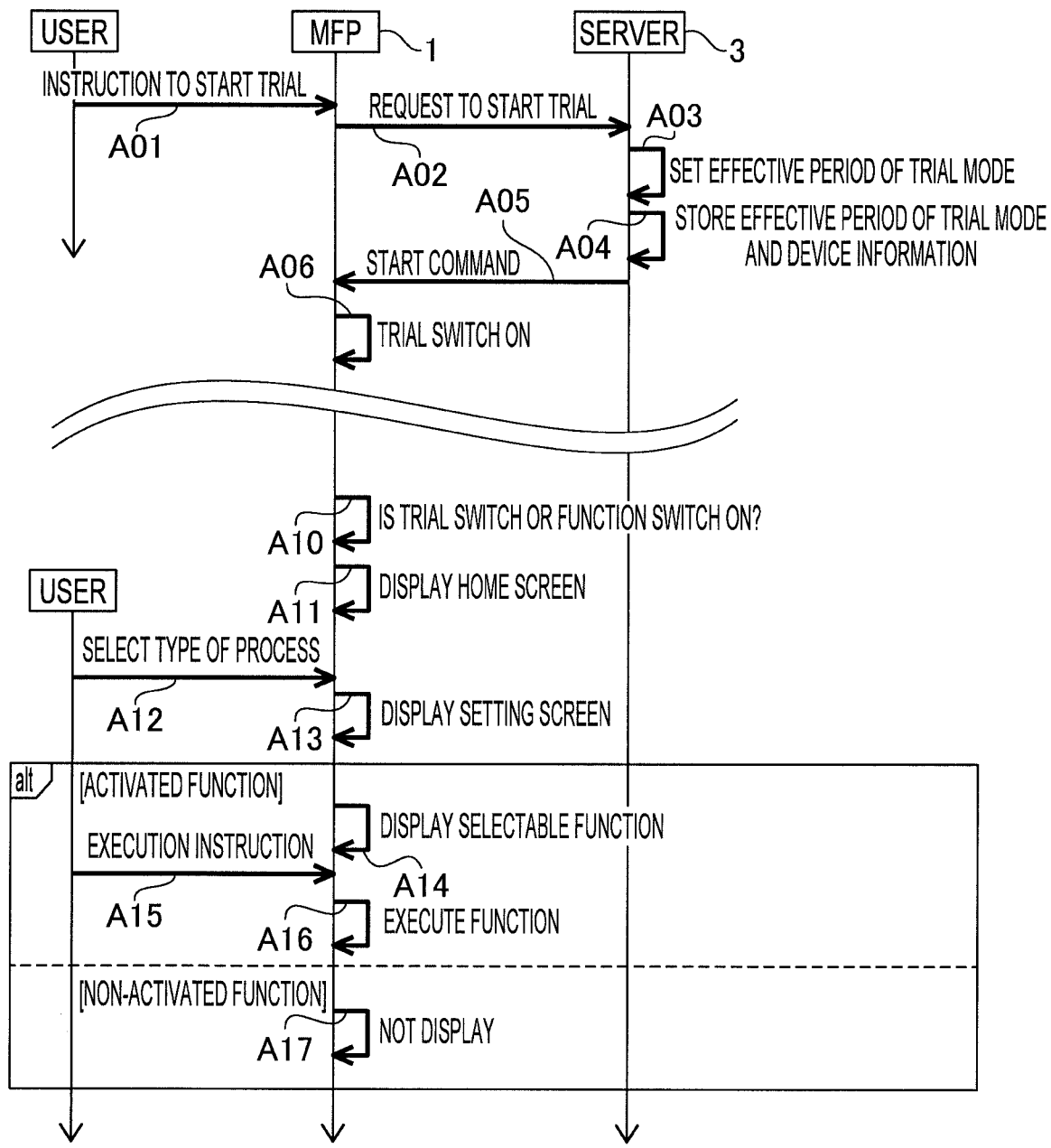
FIG. 2 is a sequence diagram illustrating an example of a procedure of starting a trial mode.

When the MFP 1 is restarted in a state where the trial switch 28 is off, the MFP 1 determines that the trial switch 28 is off in A05 of FIG. 2, and thus the MFP 1 cannot use any additional functions other than those activated by the function switches 25 to 27. However, even if the MFP 1 is restarted in a state where the trial switch 28 is turned off, the MFP 1 does not execute the trial termination process when the information indicating the outside of the effective period of the trial mode is not stored in the memory 12. In other words, the MFP 1 retains the information of the additional functions in the memory 12 by not initializing the setting information of the additional functions and by not erasing the data related to the additional functions. The information indicating that the trial mode is outside the effective period is stored in the memory 12, for example, in C05 of FIG. 6, when the information indicating that the current time is outside the effective period is received from the server 3.

As described above, when the MFP 1 has not received information, from the server 3, indicating that the current time is outside the effective period, the MFP 1 accesses the server 3 via the Internet 200 at a particular regular timing even if the trial switch 28 is off, and transmits a checking command to the server 3 to check whether the current time is within the effective period. A process in E03 is the same process as in C01 of FIG. 6. The timing at which the MFP 1 performs transmission in E03 is an example of a third timing.

Then, the MFP 1 receives the status information from the server 3 (E04). When the current time is within the effective period of the trial mode, the server 3 transmits information indicating that the current time is within the effective period as the status information, as described above. Therefore, the MFP 1 receives the status information indicating that the current time is within the period in E04. In this case, the process in E04 is the same process as in C03 of FIG. 6. In a case where the MFP 1 receives the information indicating that the current time is within the effective period from the server 3, when the trial switch 28 is off, the MFP 1 turns on the trial switch 28 (E05).

As a result, the MFP 1 is again in the trial mode and is ready to use the additional functions. Then, when the MFP 1 receives the instruction to execute the additional function, the MFP 1 can use the setting information and data stored in the memory 12, and can receive changes and additions of the setting information and data. Since internal operations are likely to be unintended by the user, by not initializing the setting information, deteriorations in convenience for the user can be suppressed.

The MFP 1 may, for example, receive an instruction to change the state of the trial switch 28 again after the completion of the work by the maintenance worker. In this way, even when the trial switch 28 is turned on, the MFP 1 is again ready to use the additional functions. Alternatively, the MFP 1 may be configured to receive the instruction to start the trial again after restarted in a state where the trial switch 28 is turned off. In this case, the MFP 1 transmits a request to start the trial mode to the server 3 as described above (A02 of FIG. 2). Since the server 3 has already stored the information of the effective period of the trial mode of the MFP 1, the server 3 may transmit the start command without setting a new period if the current time is within the effective period (A05). In this case also, the MFP 1 turns on the trial switch 28 and enters the trial mode.

As described in detail above, in the image processing system 100 according to the present embodiment, after the trial mode is terminated, the MFP 1 does not receive an instruction to execute an additional function that has not been activated, and thus the setting information used in the additional function that has not been activated is not used. In this case, there is a high possibility that the setting information will remain in the memory 12 even though the user no longer uses the setting information and is no longer aware of its existence, which increases the risk of the setting information being leaked. Since the MFP 1 according to the present embodiment initializes the setting information which is to be used in the additional functions that have not been activated in the trial termination process, the risk of leakage of the setting information can be reduced. On the other hand, since the MFP 1 does not initialize the setting information for the additional functions that are activated at the time when the trial mode is terminated, the user can continue to use the setting information, and the re-input of the setting information becomes unnecessary, thereby reducing the user's troublesome re-inputting operations.

In addition, since the MFP 1 according to the present embodiment initializes the setting information to be used by additional functions that have not been activated in the trial termination process, reduction of the increased load on memory 12 can be achieved.

Further, in the trial termination process, the MFP 1 according to the present embodiment initializes the setting information intrinsic to the additional functions that have not been activated, and does not initialize the shared setting information when the additional functions that share the setting function are activated. Therefore, the setting information can be used when using the additional functions that share the setting information, and the need to re-enter the information is avoided. On the other hand, when the additional function that share the setting information is not activated, the setting information is initialized, thereby reducing the risk of information leakage.

When the second SP function is not activated and a print job that uses the second SP function is stored in the memory 12, the MFP 1 according to the present embodiment erases the print job in the trial termination process. Since print jobs that use the second SP function cannot be executed by the first SP function or the third SP function, the risk of information leakage can be further reduced by deleting the print jobs. On the other hand, when the second SP function is activated, the MFP 1 does not erase the print job performed by the second SP function, thus reducing the user's operation to resubmit the print job. In addition, even when the third SP function is not activated and a print job that uses the third SP function is stored in the shared server, the MFP 1 according to the present embodiment does not erase the print job, thereby avoiding the problem that the image data of the print job cannot be used by other image processing apparatuses.

Further, when the trial switch 28 is turned off within the effective period of the trial mode due to maintenance work or the like, the MFP 1 according to the present embodiment does not execute the trial termination process and does not initialize the setting information, so that the information is not lost against the user's intention.

It is noted that the above-described embodiment is merely an example and does not limit aspects of the present disclosures in any way. Therefore, the technology disclosed in the present specification can naturally be improved and transformed in various ways within aspects of the present disclosures. For example, an example of an image processing apparatus is not limited to an MFP, but is aspects of the present disclosures are applicable to printers, scanners, facsimile machines, computer sewing machines, and the like, as long as they are equipped with an image processing function and a connection function to the Internet 200. Furthermore, the shared server 300 and the server 3 may be the same device.

The notification screens illustrated in this specification are all examples, and the arrangement of each notification screen and the wording included are not limited to those shown in the drawings. For example, according to the present embodiment, it is assumed that, after displaying the notification screen 51, the notification screen 52 is displayed according to the presence or absence of a stored job, but the notification screen 51 with different notification contents may be displayed according to the presence or absence of a stored job. In addition, there is no need to report the period of time about to expire or the connection failure. In this case, the status information transmitted from the server 3 may be information indicating only whether the current time is within or outside the effective period.

According to the present embodiment, it is assumed that the notification screens 51, 53 and 54 are displayed when the home screen 50 is displayed. However, the timing of display is not limited to such a timing. For example, the notification screens 51, 53 and 54 may be displayed periodically, or when any operation to the user IF 13 is received. Further, each notification screen may be displayed on the setting screen when a process related to an additional function is selected. Even when displayed on the setting screen, the various operations to the setting screen may be restricted by the notification screen.

According to the present embodiment, the instructions for iconizing or stopping the notification are received on the notification screens 51 and 52. However, the configuration may be modified such that the instructions for iconizing or stopping the notification are not received on the notification screens 51 and 52. In other words, the MFP 1 may be configured to receive only the instruction to restart when the current time is outside the effective period. Further, when the MFP 1 does not receive the user's operation after a particular waiting time has elapsed since the notification screen 51 or 52 was displayed, the MFP 1 may be configured to automatically restart. Furthermore, when the state of the trial switch 28 can be changed without restarting, the MFP 1 may not need to be restarted but only to change the state of the trial switch 28. Instead of changing the state of the trial switch 28 to the executed state, the MFP 1 may erase the state of the trial switch 28 from the memory 12. For example, the MFP 1 may set the trial mode as the state of the function switch. For example, in addition to the off and on states, a state "during the trial mode" may be set. The server 3 may be configured to store the information indicating that the trial mode has been executed.

The effective period may be managed by the MFP 1. However, it may be more appropriately that the effective period is managed by the server 3. According to the present embodiment, even if the communication between the MFP 1 and the server 3 is abnormal, the trial mode is not automatically terminated. The configuration may be modified such that the trial mode may be forcibly terminated in a case where the status information cannot be obtained for a particular number of consecutive times (occurrences). In such a case, even after the trial mode is terminated, the termination of the trial mode may optionally be notified.

According to the present embodiment, the MFP 1 is configured to determine whether the current time is within the effective period of the trial mode when the instruction for activation of additional functions is received. The configuration may be modified such that the MFP 1 is configured not to determine whether the current time is within the effective period of the trial mode. For example, when it is determined that the current time is outside the effective period of the trial mode, the MFP 1 may check the activating states of the additional functions, and when all the additional functions are activated, the MFP 1 terminates the trial mode without any notification. According to the present embodiment, the MFP 1 is configured to have a plurality of additional functions that can be individually activated. The configuration may be modified such that the MFP 1 has only one additional function. Further, according to the present embodiment, all the additional functions can be tried in the trial mode. The configuration may be modified such that a request for the trial may be received for each function.

According to the present embodiment, the trial switch 28 is provided separately from the function switches 25-27. The configuration may be modified. For example, there may be a trial-mode state other than the off state and the on state as the state of each of the function switches 25 to 27. According to such a modification, when the trial mode is started, the MFP 1 may switch all the function switches 25 to 27 that are not turned on to the trial-mode state.

According to the present embodiment, the MFP 1 is equipped with three types of secure print functions, but the MFP 1 does not need to be limited in such a manner. For example, the first SP function can be eliminated. Alternatively, the MFP 1 may be provided with only one of the second SP function and the third SP function as an additional function. Further, the MFP 1 may, for example, be provided with additional secure print functions with different execution conditions in addition to the three types according to the above-described embodiment.

According to the present embodiment, when executing a print job using the second SP function or the third SP function, the MFP 1 receives the selection of the print job to be executed from among the print jobs of the logged-in user when the login authentication is successful. However, the reverse order may also be acceptable. That is, when the selected print job is a print job using the second SP function or the third SP function, the MFP 1 may be configured to require the login input. Alternatively, the MFP 1 may execute all the print jobs of the logged-in users who have successfully authenticated. Even in this case, the login authentication is included in the execution condition, and the MFP 1 can execute printing of the print job after the login authentication is successful.

The MFP 1 may be configured to receive the selection of the first SP function even if the current time is within the effective period of the trial mode. For example, the MFP 1 may not activate the second SP function at the start of the trial mode, and may not activate either the second SP function or the third SP function unless the trial instruction by the user is received. Alternatively, the MFP 1 may activate the second SP function at the start of the trial mode, and make the first SP function, the second SP function, and the third SP function be selectable within the effective period of the trial mode.

According to the present embodiment, the setting information is not initialized at the time of switching between the second SP function and the third SP function within the effective period of the trial mode. The configuration may be modified such that the setting information is initialized at the time of switching between the second SP function and the third SP function within the effective period of the trial mode. Alternatively, the user may be asked whether to initialize or not. When the instruction to switch from the second SP function to another SP function is received within the effective period of the trial mode, when the print job received by the second SP function remains in the memory 12, the print job itself may be erased, or the user may be informed that printing of the print job will no longer be possible.

According to the present embodiment, the additional functions are installed in the MFP 1 from the time of shipment from the factory as function programs 22-24. However, there may be functions that can be installed after shipment from the factory. For example, the MFP 1 may be configured to install new additional functions by updating the firmware. Since the timing at which the firmware is updated is unrelated to the effective period of the trial mode, a new additional function may be implemented during the effective period of the trial mode. When a new additional function becomes ready to be tried as the firmware is updated, the MFP 1 receives instructions for the trial as the setting information used in the function is initialized. However, the MFP 1 will not transmit the information of the firmware update to the server 3, and the effective period of the trial mode will not be changed.

In any sequence diagram disclosed in the above-described embodiment, a plurality of processes in any plurality of steps can be arbitrarily changed in the order of execution, or executed in parallel, to the extent that there is no inconsistency in the processing content.

The processing disclosed in the embodiments may be executed by hardware such as a single CPU, multiple CPUs, an ASIC, or a combination thereof. In addition, the processing disclosed in the embodiment may be realized in various forms, such as a non-transitory recording medium in which a program for executing the processing is recorded as computer-executable instructions, or a method.

What is claimed is:

1. An image processing apparatus comprising:
an image processor;
a user interface;
a memory; and
a computer,
wherein the image processing apparatus has a special function, the memory storing setting indicating that the special function is to be activated or inactivated, the special function being inactivated when the image processing apparatus is shipped from a factory,
wherein the computer is configured to, when receiving an input of a start command indicating start of a trial mode, execute a start process of starting the trial mode, the trial mode being a mode in which the special function is activated to be tried, an effective period being set to the trial mode, the special function becoming activated during the effective period of the trial mode,
wherein the computer is configured to perform
a determining process of determining, at a first timing after receipt of the start command, whether a current time is within the effective period of the trial mode, and
a termination process of terminating the trial mode at a second timing after determining that the current time is not within the effective period of the trial mode,
wherein, when receiving a first job including image data, the image processing apparatus is configured to store the image data included in the first job until an execution condition of the first job is satisfied based on an input operation to the user interface,
wherein the image processing apparatus has an accumulated job function of executing a process of the image processor based on the image data of the first job after the execution condition of the first job is satisfied,
wherein a number of the special function of the image processing apparatus is a plural number,
wherein an execution method of the accumulated job function includes a first method of the accumulated job,
wherein in a case where the first method of the accumulated job is activated, the image processing apparatus is configured to receive an input of first input information through the user interface, the execution condition of the first method of the accumulated job being satisfied when the first input information is appropriate,
wherein the first method of the accumulated job is included in the plural number of special functions,
wherein the execution method of the accumulated job function further includes a second method of the accumulated job, execution conditions of the first method of the accumulated job and the second method of the accumulated job being different from each other,
wherein, when the first method of the accumulated job is activated, the second method of the accumulated job becomes inactivated, and
wherein, when the first method of the accumulated job is inactivated, the second method of the accumulated job becomes activated.

2. The image processing apparatus according to claim 1, wherein function information is stored in the memory for each of the plural number of special functions, the function information indicating whether each of the plural number of special functions is activated, and wherein, when the trial mode is terminated, the image processing apparatus is configured to when the function information indicating that the first method of the accumulated job is inactivated is stored in the memory, execute an initialization process of initializing the setting information of the first method of the accumulated job stored in the memory and execute an erasing process of erasing the image data of the first job stored in the memory, and when the function information indicating that the first method of the accumulated job is activated is stored in the memory, not execute the initialization process or the erasing process, the first method of the accumulated job with respect to the first job being continued to be activated after the trial mode is terminated in a case where the function information indicates the first method of the accumulated job is activated.

3. The image processing apparatus according to claim 1, wherein, in the termination process, the computer is configured to terminate the trial mode, as the second timing, at a timing of starting the image processing apparatus after determining that the current time is not within the effective period of the trial mode in the determining process.

4. The image processing apparatus according to claim 1, wherein all of the plurality of special functions are inactivated when the image processing apparatus is shipped from a factory.

5. An image processing apparatus comprising:
an image processor;
a user interface;
a memory; and
a computer,
wherein the image processing apparatus has a special function, the memory storing setting indicating that the special function is to be activated or inactivated, the special function being inactivated when the image processing apparatus is shipped from a factory,
wherein the computer is configured to, when receiving an input of a start command indicating start of a trial mode, execute a start process of starting the trial mode, the trial mode being a mode in which the special function is activated to be tried, an effective period being set to the trial mode, the special function becoming activated during the effective period of the trial mode,
wherein the computer is configured to perform
a determining process of determining, at a first timing after receipt of the start command, whether a current time is within the effective period of the trial mode, and
a termination process of terminating the trial mode at a second timing after determining that the current time is not within the effective period of the trial mode,
wherein the computer is configured to execute the first notification indicating termination of the trial mode and restart of the image processing apparatus, and
wherein, when a job using the image processor is remains in the memory, the first notification includes notification indicating that the job is to be erased by the restart.

6. The image processing apparatus according to claim 5, wherein, in the termination process, the computer is configured to terminate the trial mode, as the second timing, at a timing of starting the image processing apparatus after determining that the current time is not within the effective period of the trial mode in the determining process.

7. The image processing apparatus according to claim 5, wherein all of the plurality of special functions is inactivated when the image processing apparatus is shipped from a factory.

8. An image processing apparatus comprising:
an image processor;
a user interface;
a memory; and
a computer,
wherein the image processing apparatus has a special function, the memory storing setting indicating that the special function is to be activated or inactivated, the special function being inactivated when the image processing apparatus is shipped from a factory,
wherein the computer is configured to, when receiving an input of a start command indicating start of a trial mode, execute a start process of starting the trial mode, the trial mode being a mode in which the special function is activated to be tried, an effective period being set to the trial mode, the special function becoming activated during the effective period of the trial mode,
wherein the computer is configured to perform a determining process of determining, at a first timing after receipt of the start command, whether a current time is within the effective period of the trial mode, and
a termination process of terminating the trial mode at a second timing after determining that the current time is not within the effective period of the trial mode,
wherein, in the determining process, the computer is configured to transmit a checking command to a server at the first timing, the checking command including identification information of the image processing apparatus, the server being configured to determine whether the current time is within the effective period of the trial mode, the server being configured to respond by
transmitting status information indicating a determination result of determining whether the current time is within the effective period of the trial mode, and
determine whether the current time is within the trial mode based on the status information received from the server, and
wherein the computer is further configured to perform a first notification process of executing first notification to notify termination of the trial mode after determining that the current time is not within the effective period of the trial mode and before the second timing,
a second notification process of executing a second notification which is different from the first notification in a case where the status information is not received from the server,
wherein the computer is further configured to
in the determining process, store unknown information in the memory in a case where the computer does not receive the status information from the server, and
perform a second notification process of executing a second notification which is different from the first notification in a case where the unknown information is stored in the memory.

9. The image processing apparatus according to claim 8, wherein the computer is configured to receive input of the start command by receiving the start command from the server, wherein the server is configured to receive a start request of the trial mode, the start request including identification information of the image processing apparatus, and wherein the server is configured to set the effective period of the trial mode when receiving the start request, store period information indicating the set effective period of the trial mode in association with the identification information of the image processing apparatus included in the received start request, and output the start command.

10. The image processing apparatus according to claim 8, wherein the computer is configured to:

receive a termination instruction of the trial mode through the user interface while executing the second notification of the second notification process;

terminate the trial mode when receiving the termination instruction; and not execute the second notification after termination of the trial mode.

11. The image processing apparatus according to claim 8, wherein the computer is configured to:

determine, at the first timing in the determining process, whether the current time within the effective period of the trial mode and whether the effective period of the trial mode is about to expire by determining whether a remaining period of the effective period of the trial mode is within a predetermined period; and in a case where it is determined that the effective period of the trial mode is about to expire, perform a third notification process of executing a third notification to notify that the trial mode is about expire.

12. The image processing apparatus according to claim 8, wherein the special function is inactivated when the image processing apparatus is shipped from a factory.

13. An image processing apparatus comprising:

an image processor;

a user interface;

a memory; and a computer, wherein the image processing apparatus has a special function, the memory storing setting indicating that the special function is to be activated or inactivated, the special function being inactivated when the image processing apparatus is shipped from a factory, wherein the computer is configured to, when receiving an input of a start command indicating start of a trial mode, execute a start process of starting the trial mode, the trial mode being a mode in which the special function is activated to be tried, an effective period being set to the trial mode, the special function becoming activated during the effective period of the trial mode, wherein the computer is configured to perform a determining process of determining, at a first timing after receipt of the start command, whether a current time is within the effective period of the trial mode, and a termination process of terminating the trial mode at a second timing after determining that the current time is not within the effective period of the trial mode, wherein the image processing apparatus has a plurality of the special functions including a first sharing special function and a second sharing special function which share the setting information used for the first sharing special function and the second sharing special function, wherein the memory stores function information indicating whether each of the first sharing special function and the second sharing special function is activated, and wherein, when the memory stores the function information indicating that one of the first sharing special function and the second sharing special function is inactivated, the computer is configured to in a case where the memory stores the function information indicating that an other of the first sharing special function and the second sharing special function is disabled, perform initialization process of initializing the setting information stored in the memory, and in a case where the memory stores the function information indicating that an other of the first sharing special function and the second sharing special function is activated, not execute the initialization process and hold the setting information when the trial mode is terminated.

14. The image processing apparatus according to claim 13, wherein the computer is configured to perform, when receiving to activate the special function, a changing process of activating the special function by updating function information of the special function stored in the memory such that the function information indicates that the special function is to be activated, the function information of the special function indicating that the special function is not activated when the image processing apparatus is shipped from a factory, wherein the computer is further configured to perform an inputting process of inputting setting information used by the special function through an operation on the user interface during the effective period of the special function, storing the setting information input in the inputting process in the memory, and a process of the special function in accordance with the setting information stored in the memory, a determining process of determining whether a current time is within the effective period of the trial mode at a first timing within a period of the trial mode, and a termination process of terminating the trial mode at a second timing after determining that the current time is not within the effective period in the determining process, and wherein, after termination of the trial mode in the termination process, the computer is configured to perform the initialization process of initializing the setting information stored in the memory in a case where the function information indicating that the special function is to be inactivated is stored in the memory, and not perform the initialization process in a case where the function information indicating that the special function is to be activated is stored in the memory, the special function being continued to be activated after termination of the trial mode in a case where the function information indicates that the special function is to be activated.

15. The image processing apparatus according to claim 13, wherein all of the plurality of special functions are inactivated when the image processing apparatus is shipped from a factory.

16. An image processing apparatus comprising:

an image processor;

a user interface;

a memory; and
a computer,
wherein the image processing apparatus has a special function, the memory storing setting indicating that the special function is to be activated or inactivated, the special function being inactivated when the image processing apparatus is shipped from a factory,
wherein the computer is configured to, when receiving an input of a start command indicating start of a trial mode, execute a start process of starting the trial mode, the trial mode being a mode in which the special function is activated to be tried, an effective period being set to the trial mode, the special function becoming activated during the effective period of the trial mode,
wherein the computer is configured to perform
a determining process of determining, at a first timing after receipt of the start command, whether a current time is within the effective period of the trial mode, and
a termination process of terminating the trial mode at a second timing after determining that the current time is not within the effective period of the trial mode,
wherein a number of the special function of the image processing apparatus is a plural number, the plural number of the special functions including a first exclusive special function and a second exclusive special function each of which becomes activated exclusively for each other, and
wherein the computer is further configured to
receive a selection to activate one of the first exclusive special function and the second exclusive special function through the user interface during the effective period of the trial mode,
when receiving the selection to activate the first exclusive special function, activate the first exclusive special function and inactivate the second exclusive special function,
when receiving the selection to activate the second exclusive special function, activate the second exclusive special function and inactivate the first exclusive special function, and
not initialize setting information of the inactivated one of the first exclusive special function and the second exclusive special function.

17. The image processing apparatus according to claim 16, wherein the computer is configured to perform, when receiving to activate the special function, a changing process of activating the special function by updating function information of the special function stored in the memory such that the function information indicates that the special function is to be activated, the function information of the special function indicating that the special function is not activated when the image processing apparatus is shipped from a factory,
wherein the computer is further configured to perform
an inputting process of inputting setting information used by the special function through an operation on the user interface during the effective period of the special function,
storing the setting information input in the inputting process in the memory,
a process of the special function in accordance with the setting information stored in the memory,
a determining process of determining whether a current time is within the effective period of the trial mode at a first timing within a period of the trial mode, and
a termination process of terminating the trial mode at a second timing after determining that the current time is not within the effective period in the determining process, and
wherein, after termination of the trial mode in the termination process, the computer is configured to
perform an initialization process of initializing the setting information stored in the memory in a case where the function information indicating that the special function is to be inactivated is stored in the memory, and
not perform the initialization process in a case where the function information indicating that the special function is to be activated is stored in the memory, the special function being continued to be activated after termination of the trial mode in a case where the function information indicates that the special function is to be activated.

18. The image processing apparatus according to claim 16, wherein all of the plurality of special functions are inactivated when the image processing apparatus is shipped from a factory.

19. An image processing apparatus comprising:
an image processor;
a user interface;
a memory; and
a computer,
wherein the image processing apparatus has a special function, the memory storing setting indicating that the special function is to be activated or inactivated, the special function being inactivated when the image processing apparatus is shipped from a factory,
wherein the computer is configured to, when receiving an input of a start command indicating start of a trial mode, execute a start process of starting the trial mode, the trial mode being a mode in which the special function is activated to be tried, an effective period being set to the trial mode, the special function becoming activated during the effective period of the trial mode, and
wherein the computer is configured to perform
a determining process of determining, at a first timing after receipt of the start command, whether a current time is within the effective period of the trial mode, and
a termination process of terminating the trial mode at a second timing after determining that the current time is not within the effective period of the trial mode,
wherein the image processing apparatus has a particular function which is activated when the image processing apparatus is shipped from a factory, the particular function is a function activated exclusively for the special function, and
wherein the computer is further configured to
activate the special function and inactivate the particular function when starting the trial mode,
in a case where the memory stores function information indicating that the special function is inactivated, activate the particular function, and
in a case where the memory stores function information indicating that the special function is activated, maintain the particular function inactivated.

20. The image processing apparatus according to claim 16, wherein the special function is inactivated when the image processing apparatus is shipped from a factory.

* * * * *